(12) United States Patent
Brozek et al.

(10) Patent No.: US 12,407,048 B2
(45) Date of Patent: Sep. 2, 2025

(54) TERMINAL CONFIGURATION FOR A BATTERY PACK

(71) Applicant: MILWAUKEE ELECTRIC TOOL CORPORATION, Brookfield, WI (US)

(72) Inventors: Jeffrey M. Brozek, Mequon, WI (US); Donald J. Truettner, Waukesha, WI (US); Lance D. Lamont, Brookfield, WI (US); Burtrom L. Stampfl, Bristol, WI (US); Timothy R. Obermann, Waukesha, WI (US); Matthew J. Mergener, Mequon, WI (US); Seyed A. Hamidi, Milwaukee, WI (US); Jacob N. Zimmerman, Pewaukee, WI (US); Kyle J. Radovich, West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 873 days.

(21) Appl. No.: 17/671,378

(22) Filed: Feb. 14, 2022

(65) Prior Publication Data

US 2022/0231387 A1 Jul. 21, 2022

Related U.S. Application Data

(62) Division of application No. 15/934,798, filed on Mar. 23, 2018, now Pat. No. 11,251,508.

(Continued)

(51) Int. Cl.
*H01M 50/204* (2021.01)
*H01M 10/44* (2006.01)
(Continued)

(52) U.S. Cl.
CPC ....... *H01M 50/204* (2021.01); *H01M 10/441* (2013.01); *H01M 10/482* (2013.01);
(Continued)

(58) Field of Classification Search
CPC .. H01M 50/202; H01M 50/55; H01M 50/562; H01M 50/557; H01M 10/441;
(Continued)

(56) References Cited

U.S. PATENT DOCUMENTS

| 3,952,239 A | 4/1976 | Owings et al. |
| 5,238,083 A | 8/1993 | Horie et al. |

(Continued)

FOREIGN PATENT DOCUMENTS

| AU | 2009268165 A1 | 1/2010 |
| CN | 201353758 Y * | 12/2009 |

(Continued)

OTHER PUBLICATIONS

International Search Report and Written Opinion for Application No. PCT/US2017/066972 dated Apr. 16, 2018, 15 pages.

(Continued)

*Primary Examiner* — Peter G Leigh
(74) *Attorney, Agent, or Firm* — Michael Best & Friedrich LLP

(57) ABSTRACT

A battery pack, an electrical combination and a method of operating a battery pack. The battery pack may include a housing; a plurality of battery cells supported by the housing; a plurality of terminals including a positive power terminal, a negative power terminal, and a low power terminal; a low power circuit connecting the plurality of battery cells to the low power terminal and the negative terminal to output a first voltage; and a power circuit connecting the plurality of battery cells to the positive power terminal and the negative terminal to output a second voltage, the second voltage being greater than the first voltage. A terminal block for one of a battery pack and an electrical device may include a terminal with a terminal blade, and a terminal support portion.

20 Claims, 21 Drawing Sheets

Related U.S. Application Data

(60) Provisional application No. 62/475,951, filed on Mar. 24, 2017.

(51) Int. Cl.
| | |
|---|---|
| *H01M 10/48* | (2006.01) |
| *H01M 50/55* | (2021.01) |
| *H01M 50/557* | (2021.01) |
| *H01M 50/562* | (2021.01) |
| *H02J 7/00* | (2006.01) |
| *H01M 10/42* | (2006.01) |

(52) U.S. Cl.
CPC ......... *H01M 50/55* (2021.01); *H01M 50/557* (2021.01); *H01M 50/562* (2021.01); *H02J 7/0063* (2013.01); *H02J 7/00712* (2020.01); *H01M 10/4257* (2013.01); *H01M 2220/30* (2013.01)

(58) Field of Classification Search
CPC .......... H01M 10/482; H01M 10/4257; H01M 2201/30; H02J 7/00712; H02J 7/0063
USPC ....................................................... 439/638
See application file for complete search history.

(56) References Cited

U.S. PATENT DOCUMENTS

| | | | |
|---|---|---|---|
| 5,534,788 | A | 7/1996 | Smith et al. |
| 5,553,675 | A | 9/1996 | Pitzen et al. |
| 5,578,391 | A | 11/1996 | Meyers et al. |
| 5,762,512 | A | 6/1998 | Trant et al. |
| 5,973,476 | A | 10/1999 | Irvin |
| 6,225,153 | B1 | 5/2001 | Neblett et al. |
| 6,225,708 | B1 | 5/2001 | Furukawa et al. |
| 6,365,297 | B1 | 4/2002 | Wolczak et al. |
| 6,741,065 | B1 | 5/2004 | Ishii et al. |
| D535,250 | S | 1/2007 | Watson |
| 7,161,326 | B2 | 1/2007 | Kubota et al. |
| 7,323,846 | B2 | 1/2008 | Santana, Jr. |
| 7,397,219 | B2 | 7/2008 | Phillips et al. |
| 7,411,326 | B2 | 8/2008 | Achor et al. |
| 7,443,134 | B2 | 10/2008 | Phillips et al. |
| 7,463,007 | B2 | 12/2008 | Phillips et al. |
| 7,486,047 | B2 | 2/2009 | Phillips et al. |
| 7,489,108 | B2 | 2/2009 | Matsumoto et al. |
| D597,931 | S | 8/2009 | Aglassinger |
| 7,598,705 | B2 | 10/2009 | Watson et al. |
| 7,701,172 | B2 | 4/2010 | Watson et al. |
| 7,767,335 | B2 | 8/2010 | Sharrow et al. |
| D633,036 | S | 2/2011 | Murray |
| D640,196 | S | 6/2011 | Shuang et al. |
| 8,054,047 | B2 | 11/2011 | Chen et al. |
| 8,337,237 | B2 | 12/2012 | Masuda et al. |
| 8,368,283 | B2 | 2/2013 | Kim et al. |
| D679,651 | S | 4/2013 | Stratford |
| D680,064 | S | 4/2013 | Tirone et al. |
| 8,450,975 | B2 | 5/2013 | Kim |
| D687,380 | S | 8/2013 | Tirone et al. |
| 8,564,245 | B2 | 10/2013 | Bosch et al. |
| D699,180 | S | 2/2014 | Sweere et al. |
| 8,752,645 | B2 | 6/2014 | Liebhard |
| 8,766,599 | B2 | 7/2014 | Kim |
| 8,852,775 | B2 | 10/2014 | McGuire et al. |
| 9,077,053 | B2 * | 7/2015 | Schneider ............. H02J 7/0013 |
| 9,112,292 | B2 * | 8/2015 | Ogura ................. H01M 50/204 |
| 9,197,146 | B2 | 11/2015 | Mergener et al. |
| 9,444,082 | B2 | 9/2016 | Tsujimura et al. |
| D780,688 | S | 3/2017 | Elder |
| 9,601,729 | B2 * | 3/2017 | Naito ................. H01M 50/296 |
| 9,786,877 | B2 | 10/2017 | Umemura et al. |
| D812,555 | S | 3/2018 | Schoch |
| 9,923,249 | B2 | 3/2018 | Rejman et al. |
| 9,931,707 | B2 | 4/2018 | Balaster |
| D826,150 | S | 8/2018 | Cayon |
| D841,572 | S | 2/2019 | Gilpatrick et al. |
| D844,556 | S | 4/2019 | Irfan et al. |
| D844,558 | S | 4/2019 | Taniguchi et al. |
| D887,980 | S | 6/2020 | Schwalbach et al. |
| 2003/0142490 | A1 | 7/2003 | Parsons et al. |
| 2003/0201738 | A1 | 10/2003 | Yamamoto |
| 2005/0058890 | A1 | 3/2005 | Brazell et al. |
| 2005/0248320 | A1 | 11/2005 | Denning |
| 2006/0091858 | A1 | 5/2006 | Johnson et al. |
| 2006/0219059 | A1 | 10/2006 | Kageler et al. |
| 2009/0108806 | A1 | 4/2009 | Takano et al. |
| 2009/0202894 | A1 | 8/2009 | Bublitz |
| 2009/0242227 | A1 | 10/2009 | Hashimoto et al. |
| 2010/0221933 | A1 * | 9/2010 | Wu ..................... H01R 13/6581 439/98 |
| 2010/0225277 | A1 | 9/2010 | Ochi et al. |
| 2011/0163701 | A1 | 7/2011 | Carrier et al. |
| 2011/0308831 | A1 | 12/2011 | Martinsson et al. |
| 2011/0309799 | A1 | 12/2011 | Firehammer |
| 2012/0013194 | A1 | 1/2012 | Yamanoue |
| 2012/0061117 | A1 | 3/2012 | Nagasaka et al. |
| 2012/0251229 | A1 | 10/2012 | Liang et al. |
| 2013/0089764 | A1 | 4/2013 | Melnyk et al. |
| 2013/0106343 | A1 | 5/2013 | Cruise et al. |
| 2013/0244504 | A1 * | 9/2013 | Ogura ................. H01M 50/247 439/759 |
| 2013/0324981 | A1 | 12/2013 | Smith et al. |
| 2013/0324982 | A1 | 12/2013 | Smith et al. |
| 2014/0015451 | A1 | 1/2014 | Funabashi et al. |
| 2014/0131059 | A1 | 5/2014 | Verbrugge et al. |
| 2014/0147718 | A1 | 5/2014 | Furui et al. |
| 2014/0210419 | A1 | 7/2014 | Kim |
| 2014/0326477 | A1 | 11/2014 | Thorson et al. |
| 2015/0010782 | A1 | 1/2015 | Tanigaki et al. |
| 2015/0108949 | A1 | 4/2015 | Averitt |
| 2015/0228937 | A1 | 8/2015 | Spilker |
| 2015/0249237 | A1 * | 9/2015 | Naito ..................... H01R 12/58 429/7 |
| 2015/0283964 | A1 | 10/2015 | Janarthanam |
| 2015/0288219 | A1 | 10/2015 | Lin et al. |
| 2015/0328764 | A1 | 11/2015 | Yoshikane et al. |
| 2015/0333301 | A1 | 11/2015 | Ota et al. |
| 2016/0020443 | A1 | 1/2016 | White et al. |
| 2016/0049815 | A1 | 2/2016 | Wu et al. |
| 2016/0126533 | A1 | 5/2016 | Velderman et al. |
| 2016/0164328 | A1 | 6/2016 | Kim |
| 2016/0204475 | A1 | 7/2016 | White et al. |
| 2016/0226290 | A1 | 8/2016 | Johnson et al. |
| 2016/0241065 | A1 * | 8/2016 | Kondo ................. H01M 50/213 |
| 2016/0244009 | A1 | 8/2016 | Demmerle |
| 2016/0293909 | A1 | 10/2016 | O'Sullivan et al. |
| 2017/0072553 | A1 | 3/2017 | Bakker |
| 2017/0104243 | A1 | 4/2017 | Velderman et al. |
| 2017/0194670 | A1 | 7/2017 | Kawano et al. |
| 2018/0087758 | A1 | 3/2018 | Pavlik et al. |
| 2018/0169851 | A1 | 6/2018 | Radovich et al. |
| 2018/0175458 | A1 | 6/2018 | Radovich et al. |
| 2018/0277801 | A1 | 9/2018 | Brozek et al. |
| 2019/0006980 | A1 | 1/2019 | Sheeks et al. |
| 2019/0067971 | A1 | 2/2019 | Reed |
| 2019/0081290 | A1 | 3/2019 | Fauteux |
| 2020/0016734 | A1 | 1/2020 | Kelleher et al. |

FOREIGN PATENT DOCUMENTS

| | | | | |
|---|---|---|---|---|
| CN | 101758488 | A * | 6/2010 | |
| CN | 103247830 | A * | 8/2013 | ............... A47L 5/24 |
| CN | 203506135 | U | 4/2014 | |
| CN | 203808341 | U | 9/2014 | |
| CN | 212366942 | U | 1/2021 | |
| DE | 1256763 | B | 12/1967 | |
| DE | 29702266 | U1 | 5/1997 | |
| DE | 29823347 | U1 | 4/1999 | |
| DE | 102008064037 | A1 | 6/2009 | |
| DE | 102008017424 | A1 | 10/2009 | |
| DE | 102011001107 | B3 | 1/2012 | |
| EP | 1516702 | A2 | 3/2005 | |
| EP | 2645525 | A2 | 10/2013 | |

(56) References Cited

FOREIGN PATENT DOCUMENTS

| | | | |
|---|---|---|---|
| EP | 3059781 A1 | 2/2016 | |
| EP | 3085499 A1 | 10/2016 | |
| JP | 2005151794 A * | 6/2005 | ............ B23D 45/00 |
| JP | 2005287240 A | 10/2005 | |
| JP | 2007234488 A * | 9/2007 | |
| JP | 2013196816 A * | 9/2013 | ........... H01R 13/055 |
| JP | 2015526835 A * | 9/2015 | ......... H01M 20/204 |
| JP | 2016196051 A * | 11/2016 | ................ B25F 5/00 |
| KR | 20060094231 A | 8/2006 | |
| KR | 20120016993 A | 2/2012 | |
| KR | 1020120094529 A | 8/2012 | |
| KR | 101686018 B1 | 12/2016 | |
| WO | 9605623 A1 | 2/1996 | |
| WO | 0181132 A1 | 11/2001 | |
| WO | WO-2005117232 A2 * | 12/2005 | ................ B25F 5/00 |
| WO | 2008035811 A1 | 3/2008 | |
| WO | 2012023707 A2 | 2/2012 | |
| WO | 2014125758 A1 | 8/2014 | |
| WO | 2016085540 A1 | 6/2016 | |

OTHER PUBLICATIONS

International Search Report and Written Opinion for Application No. PCT/US2017/066966 dated Jul. 30, 2018, 19 pages.
International Search Report and Written Opinion for Application No. PCT/US2018/024172 dated Jul. 13, 2018, 18 pages.
International Search Report and Written Opinion for Application No. PCT/US2018/040587 dated Jan. 18, 2019, 28 pages.
Chinese Patent Office Action for Application No. 201890000654.6 dated Mar. 24, 2020 (3 pages including statement of relevance).
Australian Patent Office Examination Report No. 1 For Application No. 2018240551 dated Jul. 16, 2020 (6 pages).
Examination Report No. 2 issued by the Australian Government for Application No. 2018240551 dated Feb. 11, 2021 (4 pages).
Extended European Search Report for Application No. 18772396.0 dated Mar. 16, 2021 (9 pages).

* cited by examiner

TERMINAL CONFIGURATION FOR A BATTERY PACK

RELATED APPLICATION

This application is a division of U.S. patent application Ser. No. 15/934,798, filed Mar. 23, 2018, which claims the benefit of U.S. Provisional Patent Application No. 62/475,951, filed Mar. 24, 2017, the entire content of each of which is hereby incorporated by reference.

FIELD

The present invention relates to battery packs and electrical devices connectable to battery packs and, more particularly, to a terminal configuration for a battery pack and/or an electrical device.

SUMMARY

Tools, such as power tools (e.g., drills, drivers, saws, etc.), outdoor tools (e.g., blowers, trimmers, etc.), etc., and other electrical devices (e.g., motorized devices, non-motorized devices, chargers, etc.) (generally referred to herein as "devices" or a "device") may transfer power (e.g., be powered by, supply power to) with rechargeable battery packs. The battery pack may be detached from a device for charging or for use with other devices. In many cases, battery packs are designed such that the same battery pack may be used with many kinds of devices.

Battery packs include a number of battery cells (for example, Li-ion, NiCd, NiMH, etc.) connected in a series configuration, a parallel configuration, or a combination thereof. Power terminals are connected to the battery cells. When a battery pack is connected to a device, the power terminals of the battery pack are connected to corresponding power terminals of the device, and the battery pack provides operating power to the device through the power terminals.

Many electrical devices include a controller to monitor and control operation (e.g., motor speed, torque output, etc.) of the device. Similarly, many battery packs include a controller to monitor and control operation (e.g., charging and discharging operations, display state-of-charge, etc.).

While the device controller and the battery pack controller generally operate independently of each other, communication between the controllers may be advantageous. For example, the controllers may communicate to adjust operation based on a characteristic of the device and/or of the battery pack. As another example, the device controller may communicate with the battery pack controller to authenticate the battery pack, thereby improving the operation and security of the devices.

In some embodiments, the power terminals may be used to provide communication between the device controller and the battery pack controller. However, this may result in noise being generated on the communication line between the controllers. In addition, the amount of information that may be exchanged may be limited by the number of terminals. Accordingly, separate communication terminals that are isolated from the power terminals may be needed to provide a low-noise communication line with sufficient information capacity between the device controller and the battery pack controller.

In addition, the power received from the battery pack is used to power both the load (e.g., the motor) and the device controller. While controllers used in electrical devices generally have low power requirements, they do consume power. As such, the device controller may be put into a sleep mode to avoid unnecessarily draining the battery pack to constantly power the device controller.

Electrical device controllers also generally have low power capacity. For example, a device load (e.g., a motor) may operate in a range of 25-35 Amps (A) or more. In contrast, a device controller may operate at well under 1 A. When initiating operation of an electrical device, it may be desirable to provide low power to "wake-up" the device controller before the full voltage of the battery pack is provided to power the electrical device.

In some embodiments, a separate dedicated battery (e.g., a coin cell) may be used to power low power functions of the electrical device or the battery pack. The dedicated battery may be used separately from the battery pack to power the device controller. However, such a dedicated battery adds a separate non-chargeable or non-replaceable component to the electrical device.

In other embodiments, low power may be provided to the electrical device through a low-power circuit connected across a single battery of the battery pack. However, this may result in cell balancing issues, as one battery cell (the "low-power cell") is drained more often than the other battery cells in the battery pack, reducing the service life of the battery pack. In order to avoid these issues, the single cell low power application may be limited to very low power and infrequent operations.

Accordingly, a relatively low-power power source may be needed to power recurring low power functions of the electrical device without incurring performance or service life issues (e.g., due to cell imbalances) or adding additional non-chargeable, non-replaceable components to the battery pack or electrical device. A low-power power supply may be advantageous in powering other low-power components of an electrical device, such as an indicator/LED, a communication module, etc.

In one independent aspect, a battery pack may generally include a housing; a plurality of battery cells supported by the housing; a plurality of terminals including a positive power terminal, a negative power terminal, and a low power terminal; a low power circuit connecting the plurality of battery cells to the low power terminal and the negative terminal to output a first voltage; and a power circuit connecting the plurality of battery cells to the positive power terminal and the negative terminal to output a second voltage, the second voltage being greater than the first voltage (e.g., 80 V compared to 5 V).

In some embodiments, the low power circuit may include a transformer (e.g., a step down transformer or a low dropout regulator (LDO)). In some embodiments, the battery pack may include a controller operable to control the battery pack to selectively output the first voltage and the second voltage.

In another independent aspect, a method of operating a battery-powered device with a battery pack may be provided. The device may include a device housing, a load supported by the device housing, and a device controller supported by the device housing. The battery pack may include a pack housing, and a plurality of battery cells supported by the housing. The method may generally include supplying a first voltage from the plurality of battery cells to the device to power the device controller; and supplying a second voltage from the plurality of battery cells to the device to power the device. Supplying a first voltage may include, with a transformer (e.g., a step down transformer or a low dropout regulator (LDO)), reducing a voltage of the plurality of battery cells to the first voltage.

In yet another independent aspect, a battery pack may generally include a housing; a plurality of battery cells supported by the housing; a controller; and a plurality of terminals including a positive power terminal, a negative power terminal and a communication terminal, the communication terminal being electrically connected to the controller and operable to communicate between the controller and an external device, the communication terminal being isolated from the positive power terminal and the negative power terminal.

In some embodiments, the housing may include a terminal block supporting the plurality of terminals, the positive power terminal and the negative terminal being arranged in a first row, the communication terminal being arranged in a second row spaced from the first row.

In a further independent aspect, an electrical combination may generally include an electrical device including a device housing, a load supported by the device housing, a device controller supported by the device housing, and a plurality of device terminals including a device positive power terminal, a device negative terminal, and a device low power terminal; and a battery pack including a pack housing; a plurality of battery cells supported by the pack housing, a plurality of pack terminals including a pack positive power terminal electrically connectable to the device positive power terminal, a pack negative power terminal electrically connectable to the device negative terminal, and a pack low power terminal electrically connectable to the device low power terminal, a low power circuit connecting the plurality of battery cells to the low power terminal and the pack negative terminal to output a first voltage to power the device controller, and a power circuit connecting the plurality of battery cells to the pack positive power terminal and the pack negative terminal to output a second voltage to power the load, the second voltage being greater than the first voltage.

In another independent aspect, a terminal for one of a battery pack and an electrical device electrically connectable to the battery pack along an axis may be provided. The terminal may generally include a terminal blade extending along the axis and having opposite axially-extending faces connected by opposite axially-extending edges; and a terminal support portion extending transverse to the axis and beyond an associated face.

In some embodiments, the terminal support portion may include a transverse wing connected to one edge. In some embodiments, the support portion includes at least one rib on the associated face.

In yet another independent aspect, a terminal block for one of a battery pack and an electrical device electrically connectable to the battery pack along an axis may be provided. The terminal block may generally include a housing; and a plurality of terminals including a positive power terminal and a ground terminal, at least one terminal including a terminal blade extending along the axis and having opposite axially-extending faces connected by opposite axially-extending edges, and a terminal support portion extending transverse to the axis and beyond an associated face.

In a further independent aspect, an electrical combination may generally include a battery pack including a pack housing, a plurality of battery cells supported by the pack housing, and a pack terminal electrically connected to the battery cells; and an electrical device including a device housing, a circuit supported by the device housing, and a device terminal electrically connected to the circuit and electrically connectable to the pack terminal to electrically connect the circuit to one or more battery cells; one of the pack terminal and the device terminal including a terminal blade extending along the axis and having opposite axially-extending faces connected by opposite axially-extending edges, and a terminal support portion extending transverse to the axis and beyond an associated face.

Other independent aspects of the invention may become apparent by consideration of the detailed description, claims and accompanying drawings.

DETAILED DESCRIPTION

Figure 1:
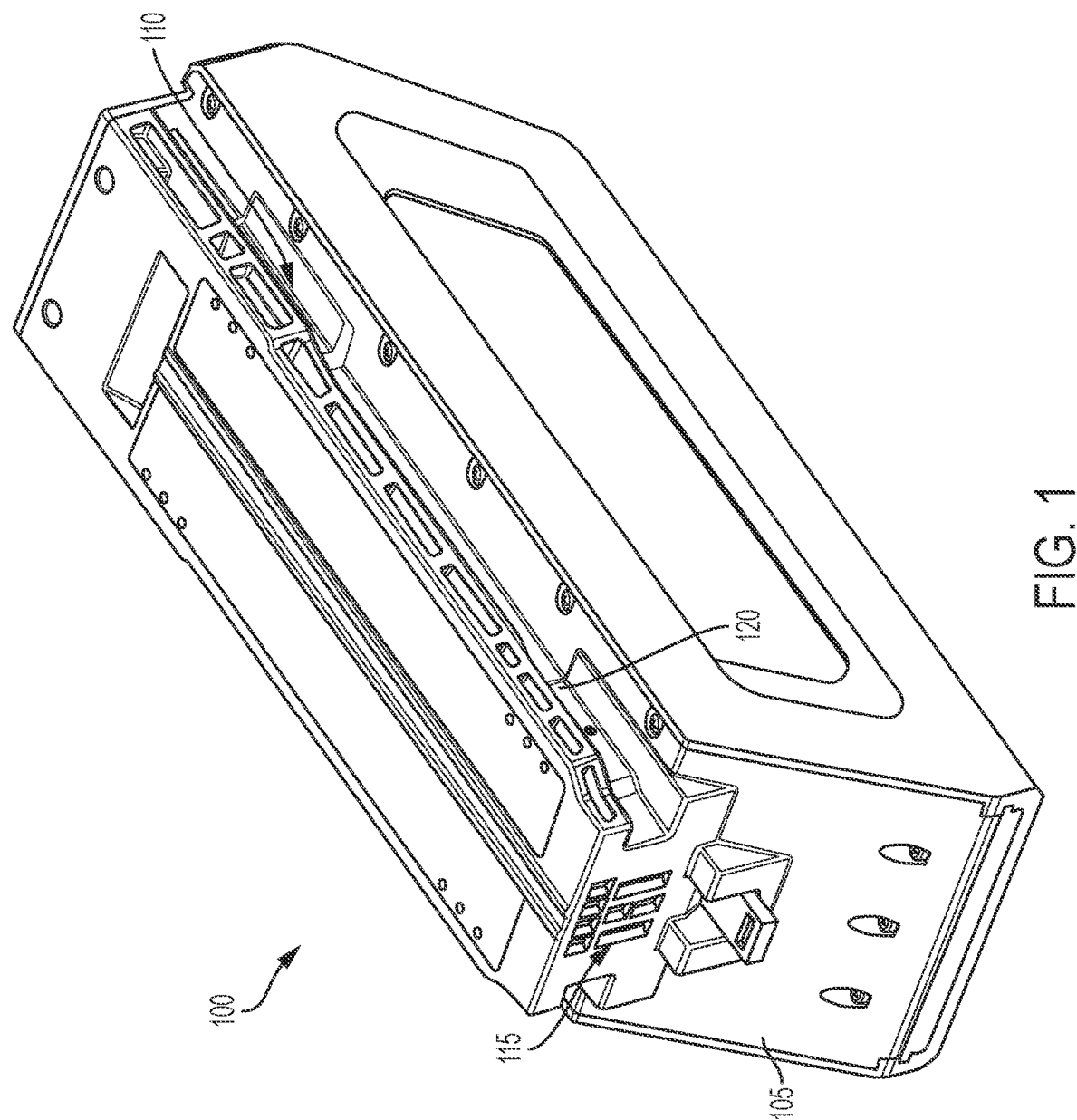
FIG. 1 is a perspective view of a battery pack.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein are for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

As shown in FIG. 1, a battery pack 100 includes a housing 105 with a support portion 110 and a terminal block 115. The housing 105 encloses components of the battery pack 100 including battery cells, a battery controller, etc. The support portion 110 provides a slide-on arrangement with a projection/recess 120 cooperating with a complementary recess/projection (not shown) of an electrical device (e.g., a power tool, an outdoor tool, etc.) or other electrical device (again, generally referred to herein as "devices" or a "device") to mechanically connect the battery pack 100 and the device.

Figure 2:
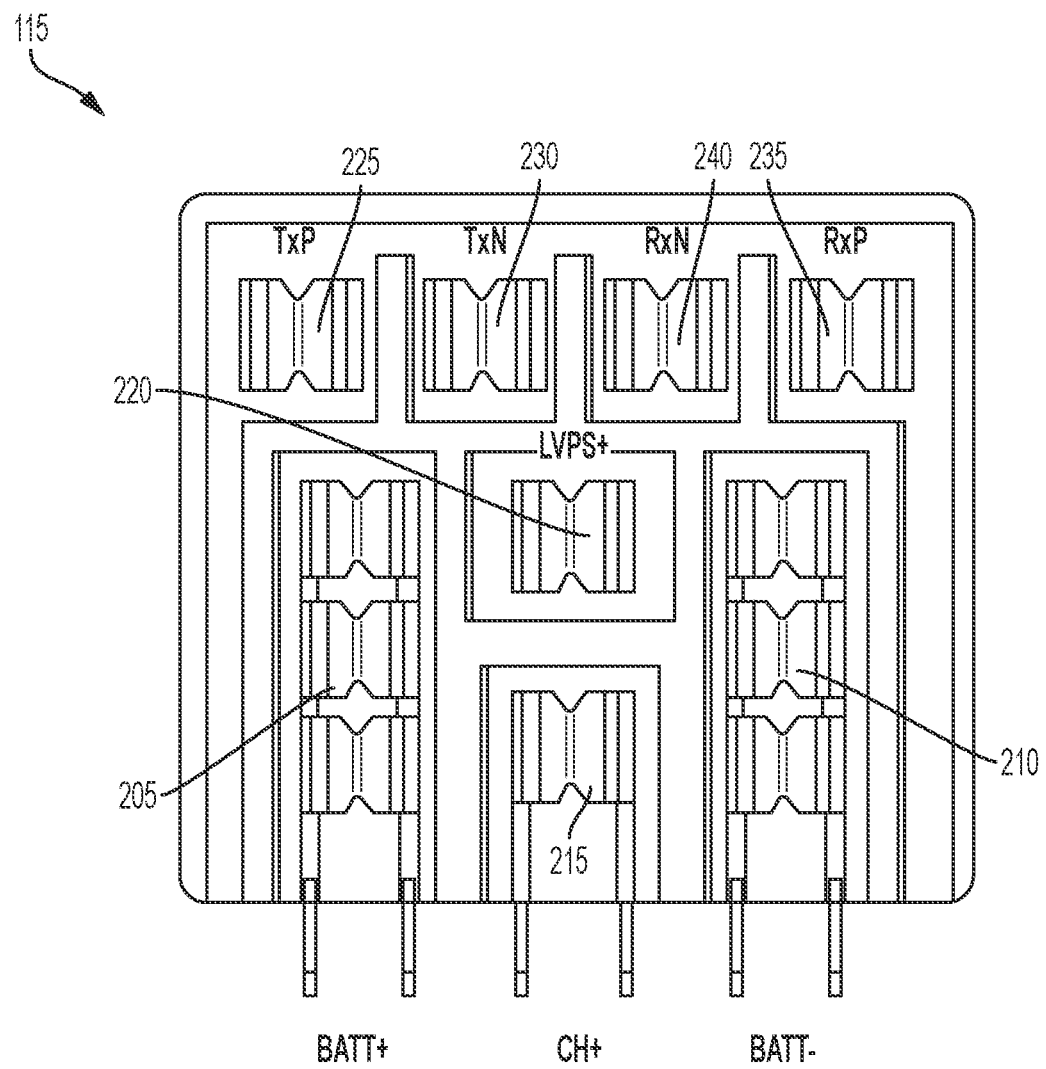
FIG. 2 is a plan view of a terminal block of the battery pack of FIG. 1.

With reference to FIG. 2, the terminal block 115 is operable to electrically connect the battery pack 100 and the electrical device and, as illustrated, includes a positive battery terminal 205, a ground terminal 210, a charger terminal 215, a low-power terminal 220, a positive transmission terminal 225, a negative transmission terminal 230, a positive receiver terminal 235, and a negative receiver terminal 240. The positive battery terminal 205 and the ground terminal 210 are connectable to power terminals of an electrical device, and provide a main discharging current for the operation of the electrical device. The charger terminal 215 and the ground terminal 210 are connected to charging terminals of a charger and receive charging current to charge the battery cells of the battery pack 100.

The ground terminal 210 may form a common reference between the battery pack 100 and the connected electrical device. The low-power terminal 220 provides a low-power voltage supply to the electrical device to power certain functions of the electrical device. For example, the low-power voltage supply may be used to power a device controller, indicators (e.g., LEDs), a communication module, etc. of the electrical device.

The positive transmission terminal 225, the negative transmission terminal 230, the positive receiver terminal 235, and the negative receiver terminal 240 may together be referred to as "communication terminals" of the battery pack 100. The communication terminals allow for differential communication between the battery pack 100 and a connected electrical device or charger. The illustrated communication terminals are only used to either receive or transmit data but not both. In other embodiments, the communication terminals follow a full-duplex standard (for example, RS485 standard).

In the illustrated construction, the communication terminals 225, 230, 235, 240 are isolated from the power terminals 205, 210, 215, 220 to provide a low-noise communication line. The communication terminals 225, 230, 235, 240 provide sufficient information capacity between the device controller and the battery pack controller.

Figure 3:
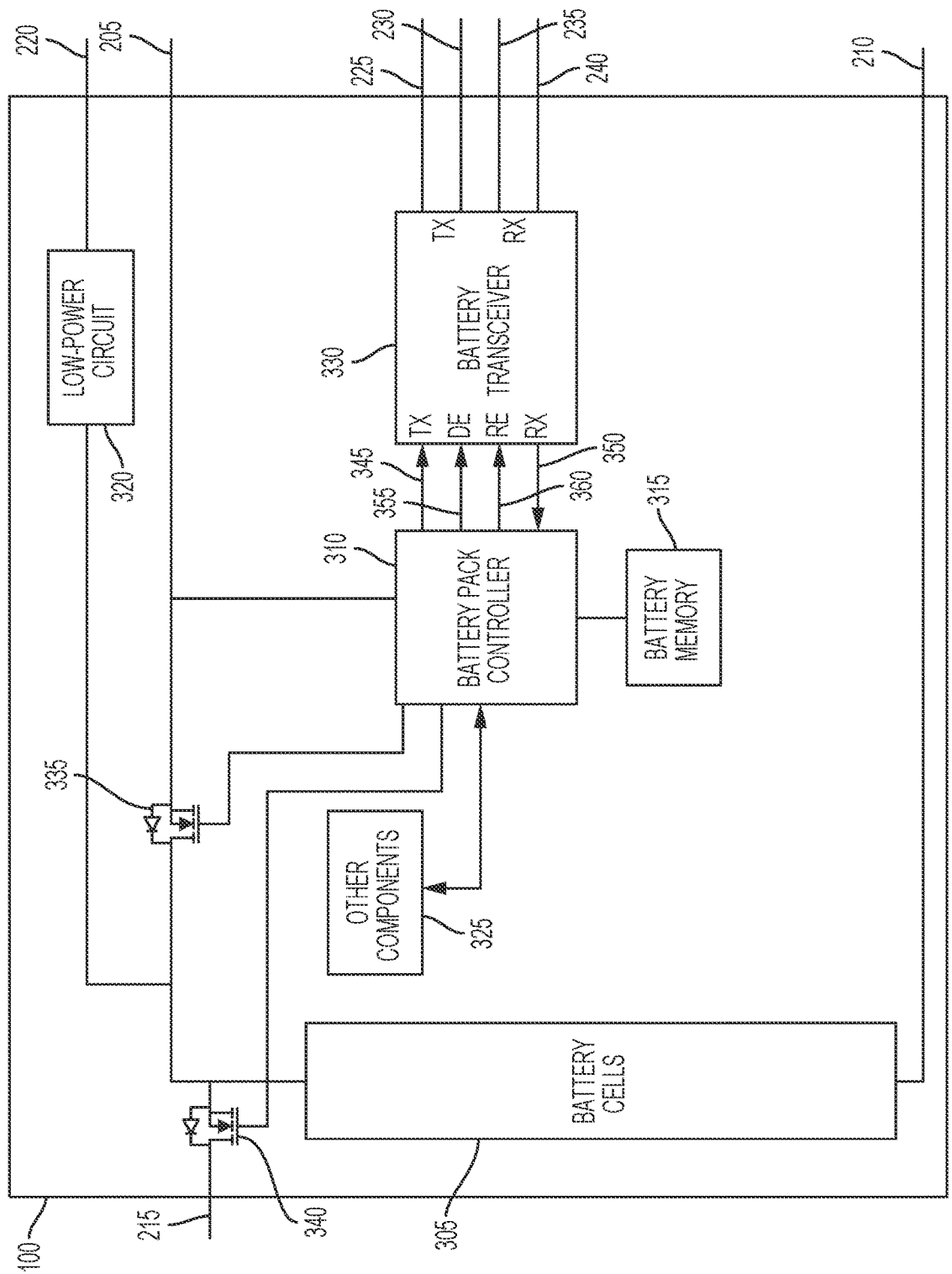
FIG. 3 is a block diagram of the battery pack of FIG. 1.

FIG. 3 is a simplified block diagram of the battery pack 100. The battery pack 100 includes battery cells 305, a battery controller 310, a battery memory 315, a low-power circuit 320, other components 325, and a battery transceiver 330. The battery cells 305 may be any rechargeable battery cell chemistry type, such as, for example, nickel-cadmium (NiCd), nickel-metal hydride (NiMH), Lithium (Li), Lithium-ion (Li-ion), other lithium-based chemistry, etc. In some embodiments, the battery pack 100 may include two or more battery cell strings connected in parallel, each having a number (e.g., five or more) of battery cells connected in series to provide a desired discharge output (e.g., nominal voltage (e.g., 20 V, 40 V, 60 V, 80 V, 120 V) and current capacity). In other embodiments, other configurations of battery cells 305 are also possible.

In some embodiments, the battery controller 310 may be implemented as a microprocessor with a separate memory, such as the battery memory 315. In other embodiments, the battery controller 310 may be implemented as a microcontroller (with battery memory 315 on the same chip). In other embodiments, the battery controller 310 may be implemented using multiple processors. In addition, the battery controller 310 may be implemented partially or entirely as, for example, a field programmable gate array (FPGA), an application specific integrated circuit (ASIC), etc., and the battery memory 315 may not be needed or be modified accordingly.

In the example illustrated, the battery memory 315 includes non-transitory, computer-readable memory that stores instructions received and executed by the battery controller 310 to carry out functionality of the battery pack 100. The battery memory 315 may include, for example, a program storage area and a data storage area. The program storage area and the data storage area may include combinations of different types of memory, such as read-only memory and random-access memory.

In some embodiments, a discharging switch 335 is connected between the battery cells 305 and the positive battery terminal 205. The battery controller 310 is operable to control (e.g., open and close) the discharging switch 335 to control discharge of the battery cells 305. In some embodiments, a charging switch 340 may also be connected between the battery cells 305 and the charger terminal 215. The battery controller 310 is operable to control (e.g., open and close) the charging switch 340 to control charging of the battery cells 305.

The discharging switch 335 and the charging switch 340 may be implemented using bi-polar unction transistors, field-effect-transistors (FETs), etc. In some embodiments, the discharging switch 335 and the charging switch 340 may be connected on the ground-side of the battery cells 305 between the battery cells 305 and the ground terminal 210. In some embodiments (not shown), the ground terminal 210 may be split into a charging path ground terminal and a discharging path ground terminal.

The low-power circuit 320 is connected between the battery cells 305 and the low-power terminal 220. The low-power circuit 320 provides a low-power voltage supply at the low-power terminal 220 to a connected electrical device. In some embodiments, the battery controller 310 may provide control signals to the low-power circuit 320 to control the operation of the low-power circuit 320. The low-power circuit 320 will be described in more detail below with reference to FIGS. 4-5.

Other components 325 of the battery pack 100 may include, for example, voltage monitoring circuits to monitor the discharge voltage, current monitoring circuits to monitor discharge current, temperature sensors, pressure sensors, analog front-ends for cell balancing, etc. The battery controller 310 communicates with the other components 325 to monitor (e.g., receive sensor data) or to control the operation of the other components 325.

In the illustrated example, the battery transceiver 330 is implemented as a differential communication transceiver (e.g., Texas Instruments SN65HVD7 Full Duplex RS-485 Transceiver). The battery transceiver 330 receives a transmission signal 345 from the battery controller 310 and sends a receiver signal 350 to the battery controller 310.

The battery transceiver 330 is also connected to the communication terminals (225, 230, 235, and 240). When the battery pack 100 transmits a communication signal to a connected electrical device or charger, the battery controller 310 sends the transmission signal 345 in addition to a transmission enable signal 355 to the battery transceiver 330. When the battery transceiver 330 receives the transmission enable signal 355, the battery transceiver 330 converts the transmission signal 345 to complementary transmission signals at the positive transmission terminal 225 and the negative transmission terminal 230. When the battery transceiver 330 receives a receiver enable signal 360 from the battery controller 310, the battery transceiver 330 receives complementary signals from the positive receiver terminal 235 and the negative receiver terminal 240, converts the complementary signals to a single receiver signal 350, and sends the receiver signal 350 to the battery controller 310.

In other embodiments, rather than the battery transceiver 330, the battery pack 100 may include separate transmitting and receiving components, for example, a transmitter and a receiver.

A purpose of the low-power terminal 220 is to provide an independent, current limited, low-power path from which the device electronics may power up. Accordingly, the device electronics may power up in a controlled fashion. In addition, the illustrated low-power circuit 320 consists of a low-power mode and a high-power mode. The low-power mode provides a minimum amount of quiescent current when both the electrical device and the battery pack 100 are in a sleep state. During normal discharge operations, the high power mode is enabled such that all device electronics may be operational.

Figure 4:
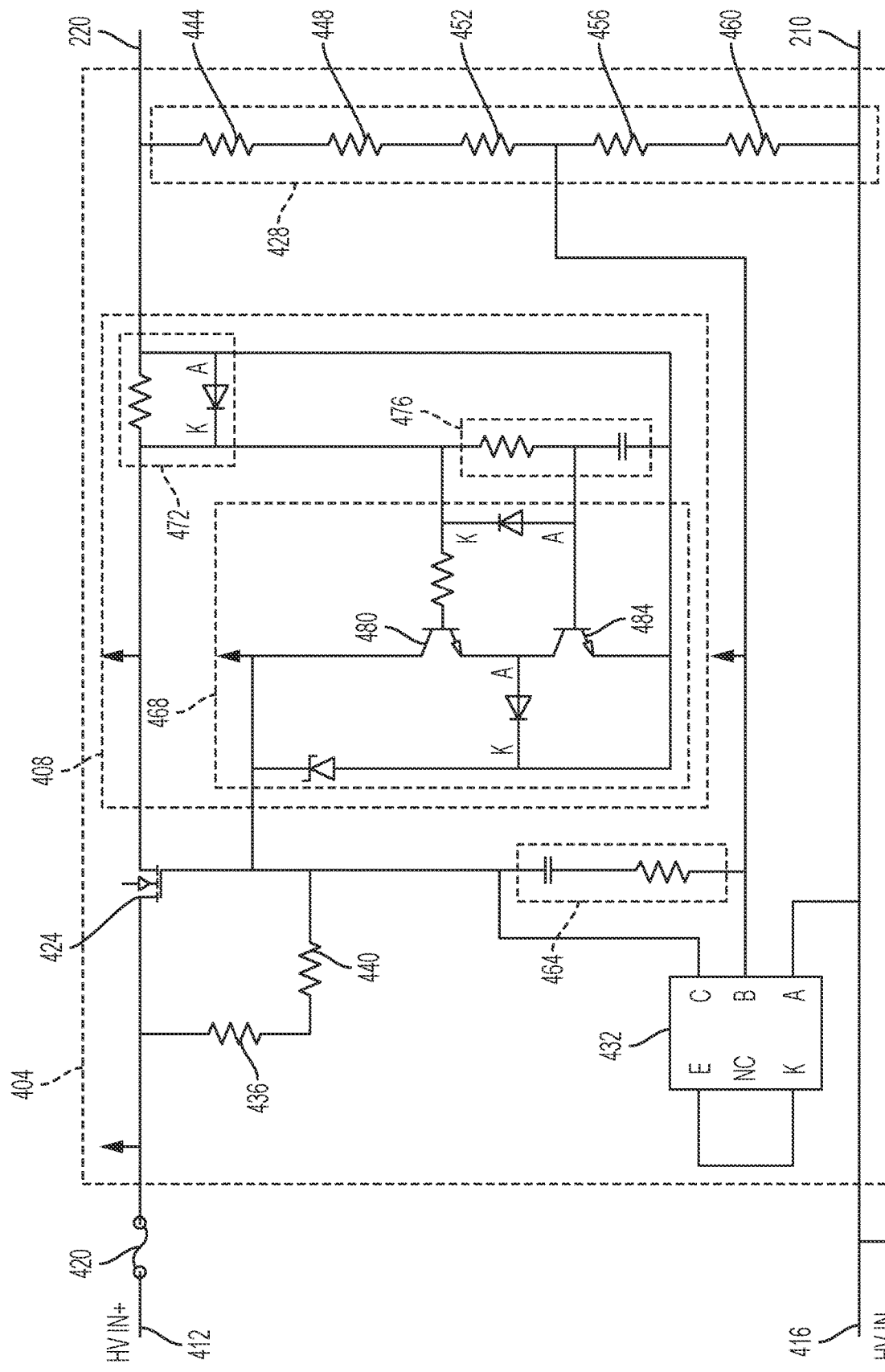
FIG. 4 is a circuit diagram of a low-current supply circuit of a low-power circuit of the battery pack of FIG. 1.

FIG. 4 is a simplified circuit diagram of one embodiment of a low-current supply circuit 400 of the low-power circuit 320. In some embodiments, the low-current supply circuit 400 may be implemented using a shunt regulator architecture. The low-current supply circuit 400 includes a voltage loop 404 and a current loop 408 within the voltage loop 404. The low-current supply circuit 400 receives input power from the battery cells 305 over a positive terminal 412 and a negative terminal 416. The nominal voltage range of the input power received over the terminals 412 and 416 may be between, for example, 40 Volts (V) to 80 V.

A fuse 420 is connected to the positive terminal 412 to act as a circuit breaker when an excess current flows through the low-current supply circuit 400. The fuse 420 may be rated for a current higher than a current output of the low-current supply circuit 400 to allow the low-current supply circuit 400 to momentarily allow higher current without nuisance tripping. In one example, the fuse 420 may be rated for 200 mA at 125 V to allow an output current of 100 mA without nuisance tripping of the fuse 420.

The voltage loop 404 includes a field-effect-transistor (FET) 424, a voltage divider circuit 428, and a voltage regulator 432. The FET 424 is connected between the battery cells 305 and the low-power terminal 220. In the illustrated embodiment, a drain of the FET 424 is connected to the output of the fuse 420, and the source of the FET 424 is connected to the low-power terminal 220. Pull up resistors 436 and 440 are connected between the drain and the gate of the FET 424 to keep the FET 424 biased in a manner to allow the FET 424 to conduct current between the battery cells 305 and the low-power terminal 220. The gate of the FET 424 is modulated by the voltage regulator 432.

Figure 5:
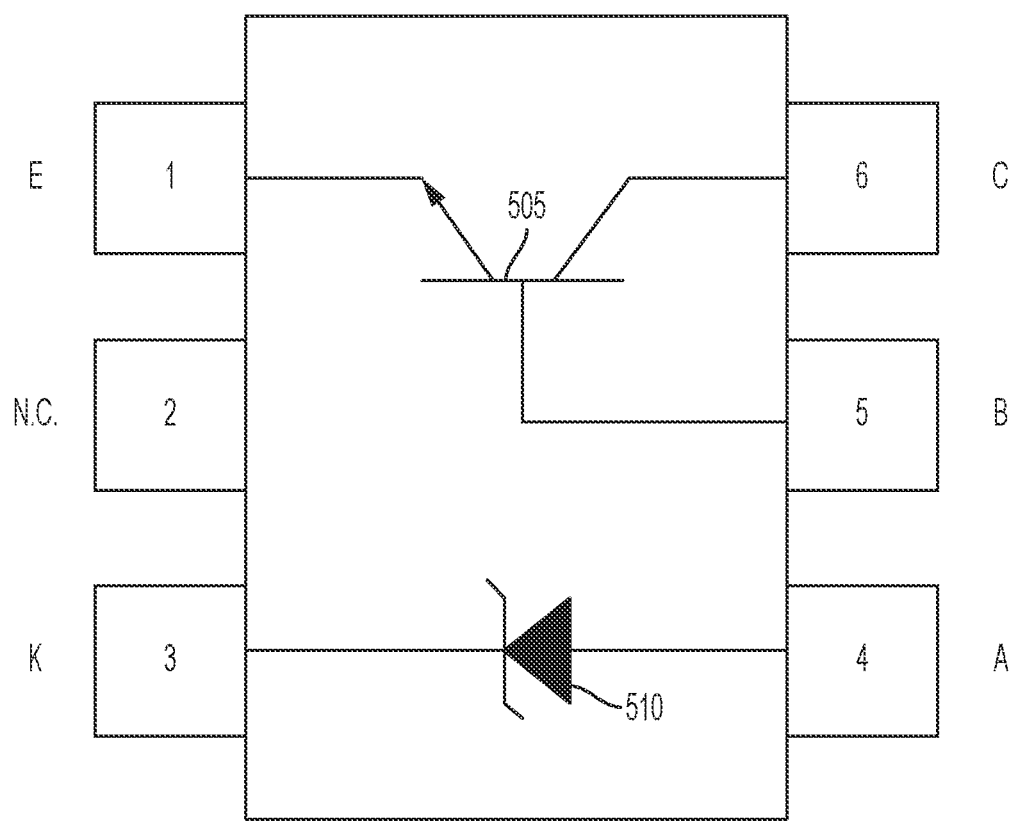
FIG. 5 is a block diagram of a voltage regulator of the low-current supply circuit of FIG. 4.

The voltage divider circuit 428 is connected between the low-power terminal 220 and the ground terminal 210. The voltage divider circuit 428 includes resistors 444, 448, 452, 456, and 460. The resistance values of the resistors 444-460 may be selected based on the desired references voltage that may be provided to the voltage regulator 432. In one example, the voltage regulator 432 may be a micro-power voltage regulator including a bipolar junction transistor and a Zener diode reference optimized for $\mu A$ level bias currents. FIG. 5 is a simplified block diagram of the voltage regulator 432 illustrating the pin connections of the bipolar junction transistor 505 and the Zener diode 510.

Returning to FIG. 4, the emitter of the bipolar junction transistor 505 is connected to the cathode of the Zener diode 510. As a result, the base-emitter junction of the bipolar junction transistor 505 is in series with the Zener diode 510. The anode of the Zener diode 510 is connected to ground.

The collector of the bipolar junction transistor 505 is connected to the gate of the FET 424. The base of the bipolar junction transistor 505 receives the reference voltage from the voltage divider circuit 428.

The voltage loop 404 operates to keep the voltage constant at the low-power terminal 220. The collector current of the bipolar junction transistor 505 varies proportionally to the voltage presented at the base terminal of the bipolar junction transistor 505. When the load at the low-power terminal 220 is increased, the voltage across the voltage divider circuit 428 decreases. As a result, the reference voltage provided to the voltage regulator 432 decreases, which, in turn, reduces the collector current. The collector current is also the current through the pull up resistors 436, 440. As such, the gate-source voltage of the FET 424 increases, which then conducts more current and increases the voltage provided at the low-power terminal 220, which is also the voltage across the voltage divider circuit 428. A stabilizer circuit 464 may be used to form a compensation network to stabilize the voltage loop 404.

The current loop 408 maintains operation of the low-current supply circuit 400 in the event of excess current or a short circuit condition. The current loop 408 may be designed to have a foldback feature which allows a first load current (e.g., 100 mA) for a pre-defined timed period before reducing the current output to a constant second load current (e.g., 50 mA). The current loop 408 includes a current regulator circuit 468, a current sensor 472 (e.g., a current sense resistor), and a timer circuit 476.

The current regulator circuit 468 includes a first bipolar junction transistor 480 and a second bipolar junction transistor 484. The first bipolar junction transistor 480 modulates the gate voltage of the FET 424 until the current sensor 472 indicates that the low-power circuit 320 is outputting a first load current. The timer circuit 476 including a resistor and a capacitor is connected between the base and emitter of the second bipolar junction transistor 484. The resistance and capacitance values of the timer circuit 476 may be selected based on the desired timing before which the load current drops from the first load current to the second load current.

Approximately at the same time the first bipolar junction transistor 480 is modulating the FET 424, the capacitor of the timer circuit 476 is being charged. For example, the capacitor and resistor values of the timer circuit 476 may be selected such that the capacitor of the timer circuit 476 charges in 1 s. When the capacitor of the timer circuit 476 is charged, the second bipolar junction transistor 484 starts conducting current thereby producing a voltage drop across the second bipolar junction transistor 484. The first bipolar junction transistor 480 then modulates the FET 424 until the current output reaches the second load current (e.g., 50 mA).

Figure 6:
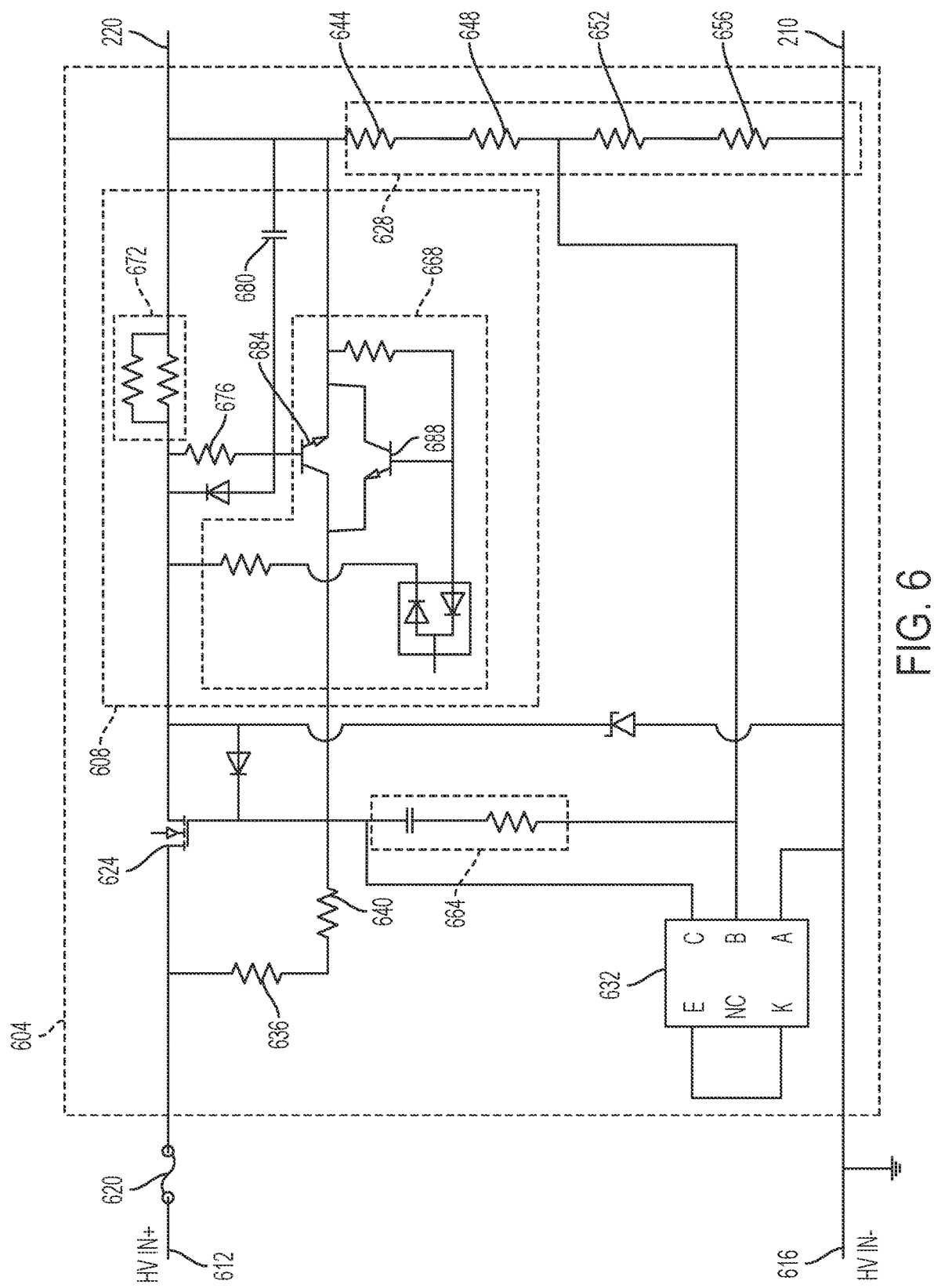
FIG. 6 is a circuit diagram of a low-current supply circuit of a low-power circuit of the battery pack of FIG. 1.

FIG. 6 is a simplified circuit diagram of another embodiment of a low-current supply circuit 600 of the low-power circuit 320. The low-current supply circuit 600 may function in a manner similar to the low-current supply circuit 400. The low-current supply circuit 600 includes a voltage loop 604 and a current loop 608 within the voltage loop 604. The low-current supply circuit 600 receives input power from the battery cells 305 over a positive terminal 612 and a negative terminal 616. The nominal voltage range of the input power received over the terminals 612 and 616 may be between, for example, 40 Volts (V) to 80 V.

A fuse 620 is connected to the positive terminal 612 to act as a circuit breaker when an excess current flows through the low-current supply circuit 600. The fuse 620 may be rated for a current higher than a current output of the low-current supply circuit 600 to allow the low-current supply circuit 600 to momentarily allow higher current without nuisance tripping. In one example, the fuse 620 may be rated for 200 mA at 125 V to allow an output current of 100 mA without nuisance tripping of the fuse 620.

The voltage loop 604 includes a field-effect-transistor (FET) 624, a voltage divider circuit 628, and a voltage regulator 632. The FET 624 is connected between the battery cells 305 and the low-power terminal 220. In the illustrated embodiment, a drain of the FET 624 is connected to the output of the fuse 620, and the source of the FET 624 is connected to the low-power terminal 220. Pull up resistors 636 and 640 are connected between the drain and the gate of the FET 624 to keep the FET 624 biased in a manner to allow the FET 624 to conduct current between the battery cells 305 and the low-power terminal 220. The gate of the FET 624 is modulated by the voltage regulator 632.

The voltage divider circuit 628 is connected between the low-power terminal 220 and the ground terminal 210. The voltage divider circuit 628 includes resistors 644, 648, 652, and 656. The resistance values of the resistors 644-656 may be selected based on the desired reference voltages that may be provided to the voltage regulator 632. As described above, the voltage regulator 632 may be a micro-power voltage regulator including a bipolar junction transistor and a Zener diode reference optimized for µA level bias currents (for example, as shown in FIG. 5).

The emitter of the bipolar junction transistor 505 is connected to the cathode of the Zener diode 510. As a result, the base-emitter junction of the bipolar junction transistor 505 is in series with the Zener diode 510. The anode of the Zener diode 510 is connected to ground. The collector of the bipolar junction transistor 505 is connected to the gate of the FET 624. The base of the bipolar junction transistor 505 receives the reference voltage from the voltage divider circuit 628.

The voltage loop 604 operates to keep the voltage constant at the low-power terminal 220. The collector current of the bipolar junction transistor 505 varies proportionally to the voltage presented at the base terminal of the bipolar junction transistor 505. When the load at the low-power terminal 220 is increased, the voltage across the voltage divider circuit 628 decreases. As a result, the reference voltage provided to the voltage regulator 632 decreases, which, in turn, reduces the collector current. The collector current is also the current through the pull up resistors 636, 640. As such, the gate-source voltage of the FET 624 increases, which then conducts more current and increases the voltage provided at the low-power terminal 220, which is also the voltage across the voltage divider circuit 628. A stabilizer circuit 664 may be used to form a compensation network to stabilize the voltage loop 604.

The current loop 608 protects the low-current supply circuit 600 in the event of excess current or a short circuit condition. The current loop 608 may be designed to have a foldback feature which allows a first load current (e.g., 180 mA) for a pre-defined time period (e.g., time) before reducing the current output to a constant second load current (e.g., 60 mA). The current loop 608 includes a current regulator circuit 668, a current sensor 672 (e.g., current sense resistors), and a timer circuit including a resistor 676 and a capacitor 680.

The current regulator circuit 668 includes a first bipolar junction transistor 688 and a second bipolar junction transistor 684. The first bipolar junction transistor 688 modulates the gate voltage of the FET 624 until the current sensor 672 indicates that the low-current supply circuit 600 is outputting a first load current. The timer circuit, including a resistor 676 and a capacitor 680, is connected between the base and emitter of the second bipolar junction transistor 684. The resistance and capacitance values of the timer circuit may be selected based on the desired timing before which the load current drops from the first load current to the second load current.

Approximately at the same time the first bipolar junction transistor 688 is modulating the FET 624, the capacitor 680 of the timer circuit 676 is being charged. For example, the capacitor 680 and resistor 676 values of the timer circuit may be selected such that the capacitor 680 of the timer circuit charges in 700 ms. When the capacitor 680 of the timer circuit is charged, the second bipolar junction transistor 684 starts conducting current thereby producing a voltage drop across the first bipolar junction transistor 687. The second bipolar junction transistor 684 then modulates the FET 624 until the current output reaches the second load current (e.g., 60 mA).

Figure 7:
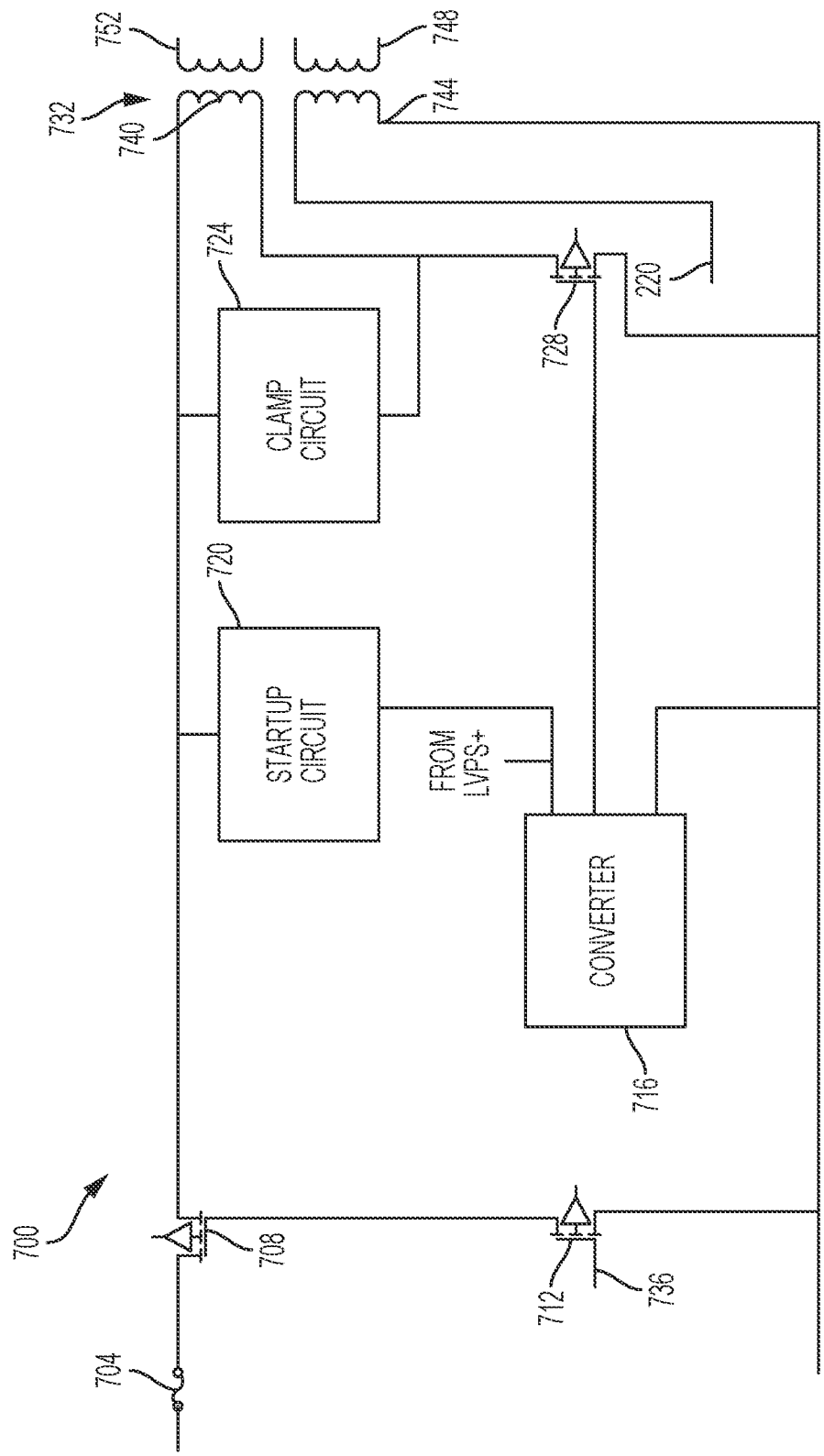
FIG. 7 is a block diagram of a high-current supply circuit of a low-power circuit of the battery pack of FIG. 1.

FIG. 7 is a simplified circuit diagram of one embodiment of a high-current supply circuit 700 of the low-power circuit 320. In the example illustrated, the high-current supply circuit 700 includes a fuse 704 an input switch 708, an enable switch 712, a flyback converter 716, a startup circuit 720, a clamp circuit 724, a primary switch 728, and a transformer circuit 732. The fuse 704 protects the high-current supply circuit 700 from short-circuit faults. The fuse 704 may have a nominal rating of, for example, 500 mA. The fuse 704 may be dimensioned to allow for full power operation at low line input.

When an enable input 736, for example, a wake-up signal, is applied to the enable switch 712, the enable switch 712 closes the input switch 708, thereby allowing current from the battery cells 305 to flow to the high-current supply circuit 700. The startup circuit 720 provides an initial power supply to operate the converter 716.

Figure 8:
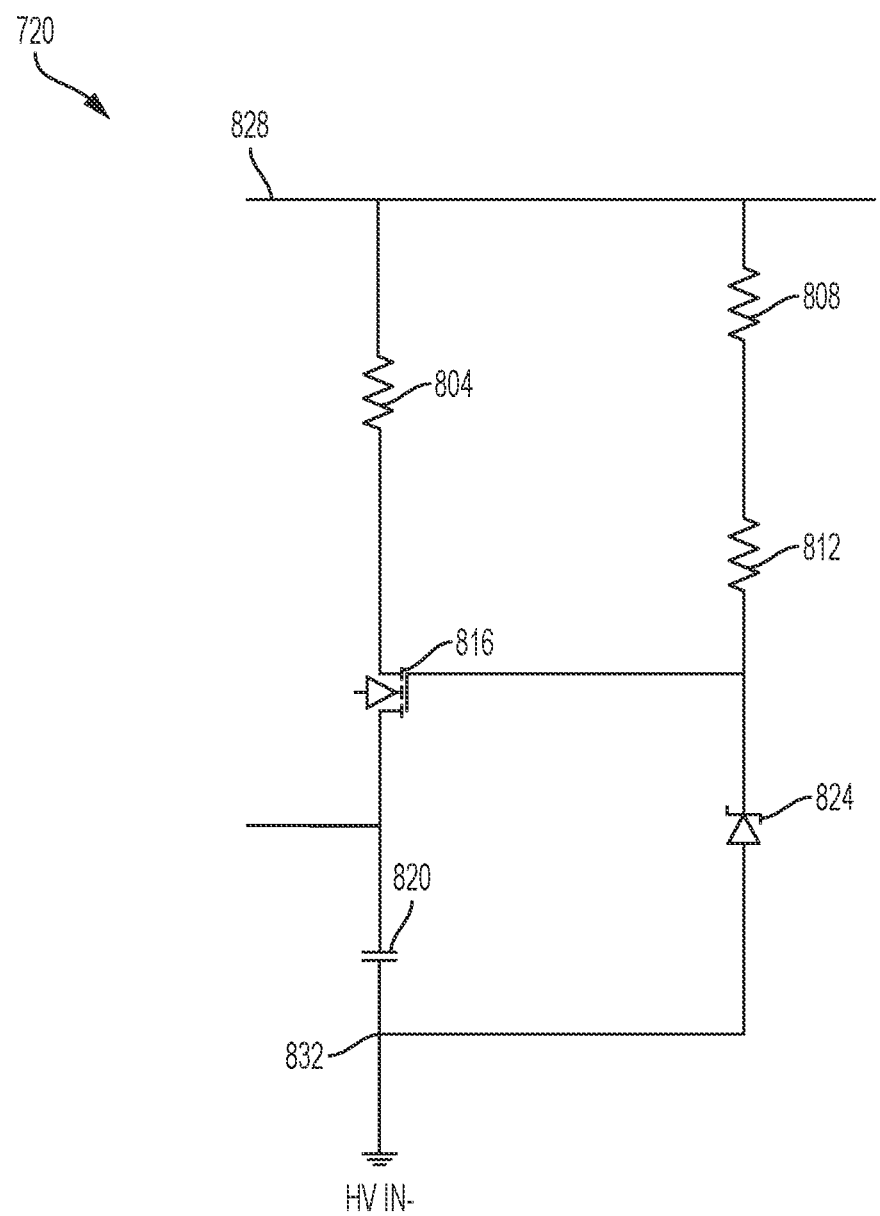
FIG. 8 is a circuit diagram of a startup circuit of the high-current supply circuit of FIG. 7.

FIG. 8 illustrates one example embodiment of the startup circuit 720. In the example illustrated, the startup circuit 720 includes a first resistor 804, a second resistor 808, a third resistor 812, a switch 816, a capacitor 820, and a diode 824. The first resistor 804, the switch 816 and the capacitor 820 are connected in series between the positive power supply 828 and ground 832. The second resistor 808, the third resistor 812 and the diode 824 are connected in series between the positive power supply 828 and ground 832 and in parallel to the first resistor 804, the switch 816, and the capacitor 820.

Initially, the voltage across the capacitor 820 may be zero. The second resistor 808, the third resistor 812, and the diode form, for example, 15V reference on a gate of the switch 816. As power is applied to the startup circuit, the switch 816 is turned on. The capacitor 820 is then charged up and by the drain current of the switch 816. When the voltage across the capacitor 820 is, for example, approximately 8V, the startup circuit 720 powers the converter 716.

Returning to FIG. 7, when the converter 716 receives the startup power, the converter 716 starts switching and modulating a gate of the primary switch 728. Eventually, the converter 716 starts up and regulates to, for example, approximately 15V. At this point, the startup circuit 720 may be turned off and the converter 716 may be powered by the output of the high-current supply circuit 700.

The clamp circuit 724 manages energy in the leakage inductance of the transformer circuit 732. The transformer circuit 732 includes a primary winding 740, and three secondary windings 744, 748, and 752. When the primary switch 728 is closed, the voltage drawn across the primary winding 740 is stepped down and provided to the secondary windings 744, 748, and 752. The secondary winding 744 provides the low-power voltage supply at the low-power voltage supply terminal 220. The secondary windings 748 and 752 provide power to the discharging switch 335 and the charging switch 340 of the battery pack 100. In some embodiments, a low dropout regulator (LDO) may be used instead of the transformer circuit 732 to step down the voltage.

When there is an activity that enables the high-current supply circuit 700 of the low-power circuit 320, the high-current supply circuit 700 may remain enabled, for example, for 100 ms from last known activity before disabling the high-current supply circuit 700 and enabling the low-current supply circuit 600. This may, for example, allow the battery pack 100 sufficient time for an orderly shutdown, to attempt a communications restart in the event of a fault.

Figure 9:
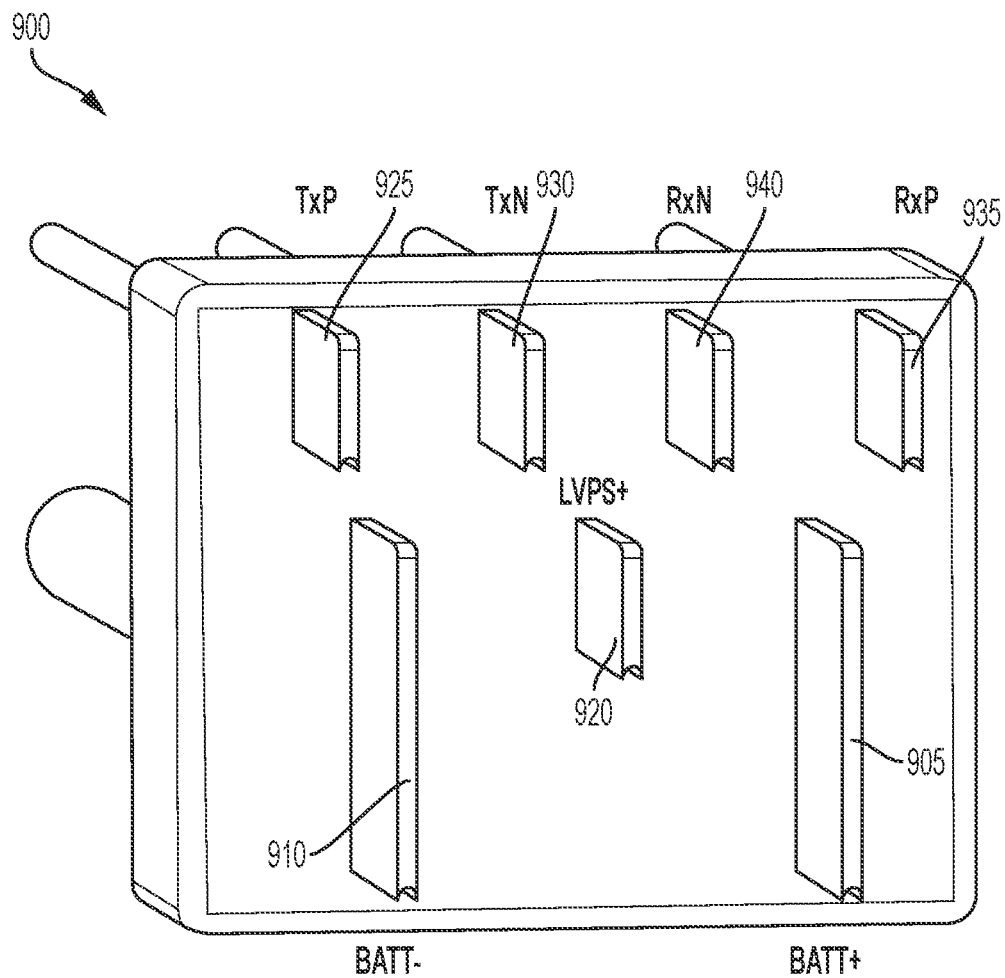
FIG. 9 is a plan view of a terminal block of an electrical device.

With reference to FIG. 9, a device terminal block 900 includes a positive power terminal 905, a ground terminal 910, a low-power terminal 920, a positive transmission terminal 925, a negative transmission terminal 930, a positive receiver terminal 935, and a negative receiver terminal 940. As described above, the positive power terminal 905 and the ground terminal 910 are connected to power terminals (i.e., positive battery terminal 205 and ground terminal 210) of the battery pack 100 to receive a main discharging current for the operation of the electrical device. The low-power terminal 920 receives a low-power voltage supply from the low-power terminal 220 of the battery pack 100 to power certain functions of the electrical device.

The positive transmission terminal 925, the negative transmission terminal 930, the positive receiver terminal 935, the negative receiver terminal 940 may together be referred to as "communication terminals" of the electrical device. The communication terminals allow for differential communication between the battery pack 100 and the electrical device. As with the communication terminals of the battery pack 100, the illustrated device communication terminals are only used to either receive or transmit data but not both. In other embodiments, the device communication terminals follow a full-duplex standard (for example, RS485 standard).

Figure 10:
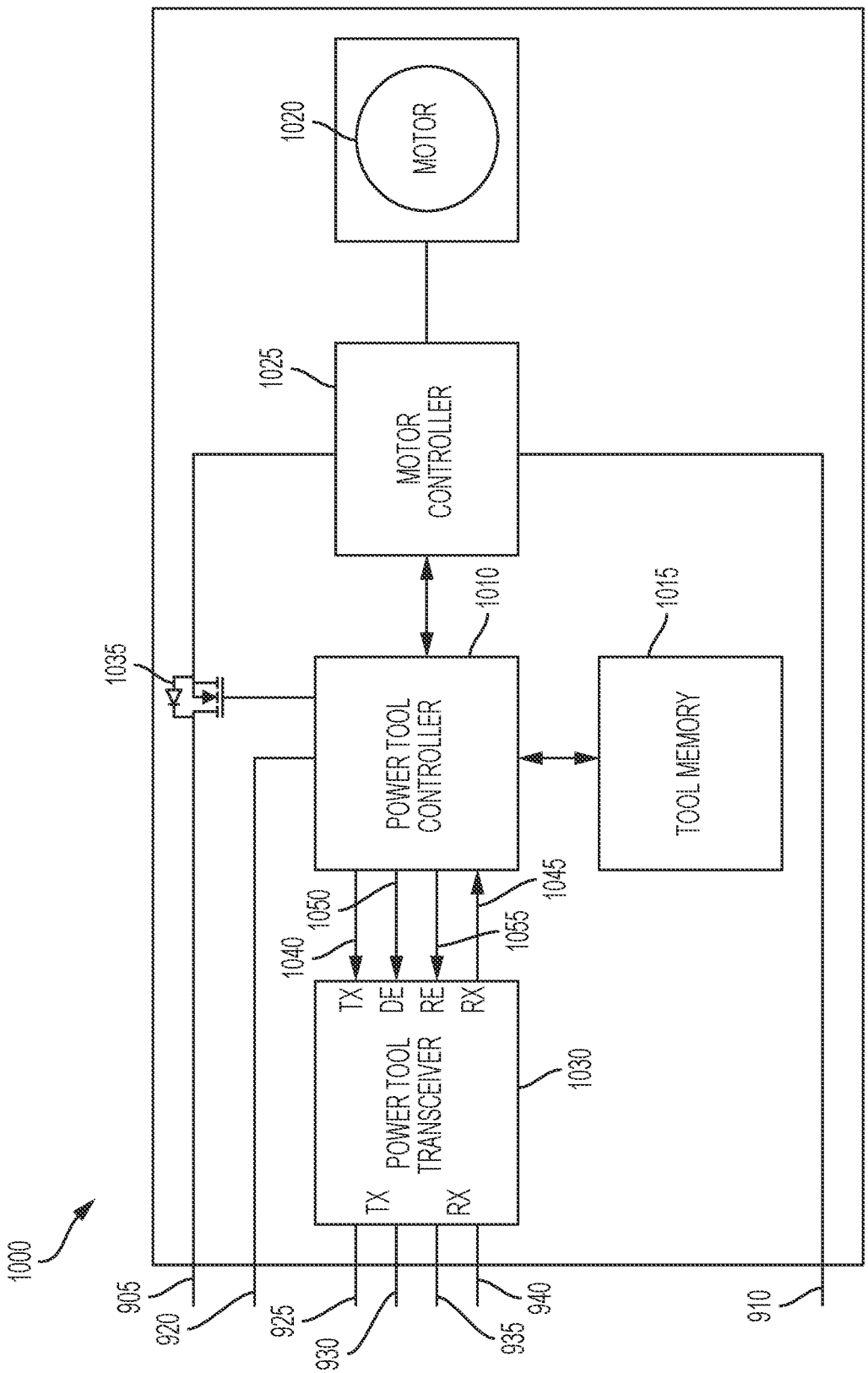
FIG. 10 is a block diagram of the electrical device.

FIG. 10 is a simplified block diagram of an electrical device 1000. The electrical device 1000 includes a device controller 1010, a device memory 1015, a load (e.g., a motor 1020), a load (motor) controller 1025, and a device transceiver 1030. The motor 1020 may be a brushed or brushless motor and is controlled by the motor controller 1025.

The motor controller 1025 may be a switch bridge including FETs that control the operation of the motor 1020. The motor controller 1025 may also include position sensors and other motor sensors. The motor controller 1025 may send positional information of the motor 1020 to the device controller 1010 and may receive control signals from the device controller 1010.

The device controller 1010 may be implemented in various ways including ways similar to those described above with respect to the battery controller 310. Likewise, the device memory 1015 may be implemented in various ways including ways that are similar to those described with respect to the battery memory 315. The device memory 1015 may store instructions received and executed by the device controller 1010 to carry out the functionality. The device controller 1010 receives operating power from the low-power terminal 920. In some embodiments, the device controller 1010 and the battery pack controller 310 may be implemented on a single controller.

In some embodiments, a discharging switch 1035 is connected between the positive power terminal 1005 and the motor controller 1025. The device controller 1010 operates to control (e.g., opens and closes) the discharging switch 1035 to control the discharge from the battery pack 100. The discharging switch 1035 may be implemented using bi-polar junction transistors, field-effect-transistors (FETs), etc. In some embodiments, the discharging switch 1035 may be connected on the ground-side of the motor controller 1025 between the motor controller 1025 and the ground terminal 910.

In the illustrated example, the device transceiver 1030 is implemented as a differential communication transceiver (e.g., Texas Instruments SN65HVD7 Full Duplex RS-485 Transceiver). The device transceiver 1030 receives a transmission signal 1040 from the device controller 1010 and sends a receiver signal 1045 to the device controller 1010. The device transceiver 1030 is also connected to the communication terminals.

When the electrical device 1000 transmits a communication signal to a connected battery pack 100, the device controller 1010 sends the transmission signal 1040 in addition to a transmission enable signal 1050 to the device transceiver 1030. When the device transceiver 1030 receives the transmission enable signal 1050, the device transceiver 1030 converts the transmission signal 1040 to complementary transmission signals at the positive transmission terminal 925 and the negative transmission terminal 930.

When the device transceiver 1030 receives a receiver enable signal 1055 from the device controller 1010, the device transceiver 1030 receives complementary signals from the positive receiver terminal 935 and the negative receiver terminal 940, converts the complementary signals to a single receiver signal 1045, and sends the receiver signal 1045 to the device controller 1010.

In other embodiments, rather than the device transceiver 1030, the device 1000 may include separate transmitting and receiving components, for example, a transmitter and a receiver.

During a sleep state, the battery pack 100 may disable the receiver terminals 235 and 240 by sending a receiver disable signal 360. In some embodiments, the device transceiver 1030 may send a wake-up pulse to the battery pack 100 to request operational power for the electrical device 1000. The battery pack 100 may include a wake-up circuit to detect the wakeup pulse, which, in turn, will drive an interrupt to the battery controller 310. The battery controller 310 enables the receiver functions of the battery transceiver 330 upon receiving the interrupt.

Figure 11:
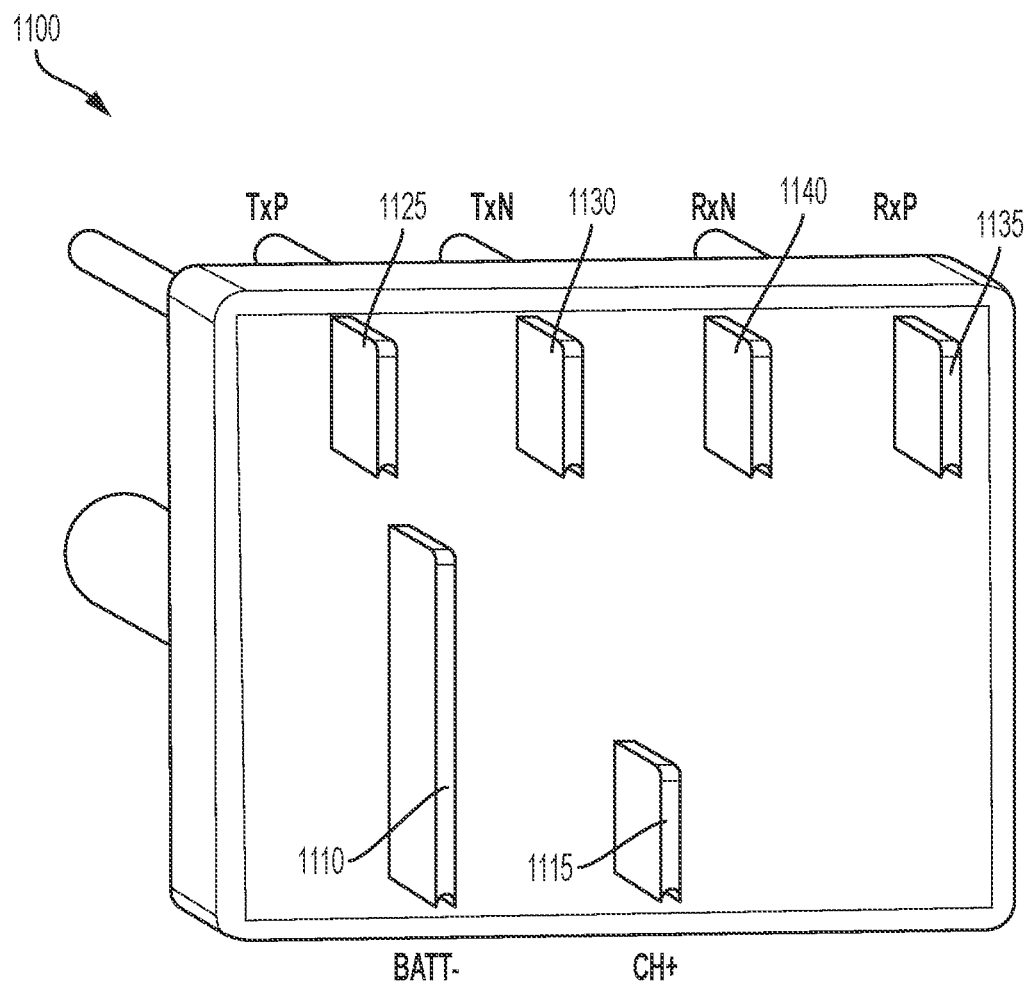
FIG. 11 is a plan view of a terminal block of a charger.

With reference to FIG. 11, a charger terminal block 1100 includes a ground terminal 1110, a charger terminal 1115, a positive transmission terminal 1125, a negative transmission terminal 1130, a positive receiver terminal 1135, and a negative receiver terminal 1140. The charger terminal 1115 and the ground terminal 1110 are connected to terminals (e.g., the charger terminal 215 and ground terminal 210) of the battery pack 100 to charge the battery cells 305 of the battery pack 100. A low-power terminal may not be needed, because the charger independently receives operating power from an external power source.

The positive transmission terminal 1125, the negative transmission terminal 1130, the positive receiver terminal 1135, the negative receiver terminal 1140 may together be referred to as "communication terminals" of the charger. The communication terminals allow for differential communication between the battery pack 100 and the charger. As with the communication terminals of the battery pack 100 and the electrical device 1000, the illustrated charger communication terminals are only used to either receive or transmit data but not both. In other embodiments, the charger communication terminals follow a full-duplex standard (for example, RS485 standard).

Figure 12:
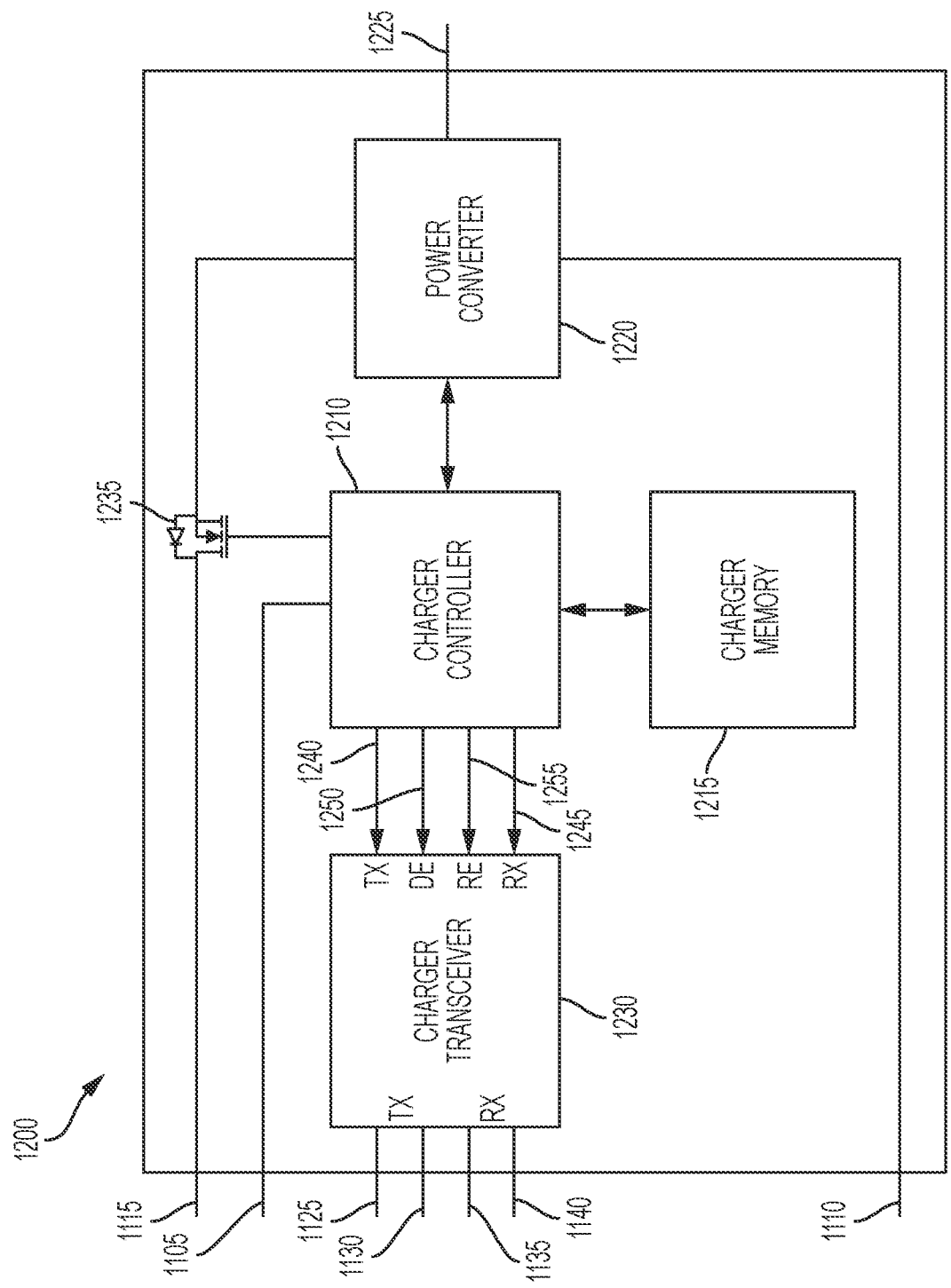
FIG. 12 is a block diagram of the charger.

FIG. 12 is a simplified block diagram of a charger 1200. The charger 1200 includes a charger controller 1210, a charger memory 1215, a power converter 1220, a power source connector 1225, and a charger transceiver 1230. The power source connector 1225 connects to an external power source (e.g., wall outlet) to receive power for charging a battery pack 100. The power converter 1220 converts the AC power received from the external power source to a DC power to charge the battery pack 100. The power converter 1220 may receive control signals from the charger controller 1210 to control the charging operation.

The charger controller 1210 may be implemented in various ways including ways similar to those described above with respect to the battery controller 310. Likewise, the charger memory 1215 may be implemented in various ways including ways similar to those described above with respect to the battery memory 315. The charger memory 1215 may store instructions received and executed by the charger controller 1210 to carry out the functionality. The charger controller 1210 receives operating power from the power converter 1220.

In some embodiments, a charging switch 1235 is connected between the charger terminal 1115 and the power converter 1220. The charger controller 1210 controls (e.g., opens and closes) the charging switch 1235 to control charging of the battery pack 100. The charging switch 1235 may be implemented using bi-polar junction transistors, field-effect-transistors (FETs), etc. In some embodiments, the charging switch 1235 may be connected on the ground-side of the power converter 1220 between the power converter 1220 and the ground terminal 1110. The charger controller 1210 may monitor the positive power terminal 1205 to determine a state of charge of the battery pack 100. In some embodiments, back-to-back MOSFETs may be used for the charging switch 1235. MOSFETs include a body diode which allows a small amount of current to flow through even when the MOSFET is open (i.e., turned off). Connecting a second MOSFET back-to-back with a first MOSFET such that the body diodes are pointing in the opposite direction may ensure that no current flows through the charging terminal 1115 when the MOSFETs are open (i.e., turned off).

In the illustrated example, the charger transceiver 1230 is implemented as a differential communication transceiver (e.g., Texas Instruments SN65HVD7 Full Duplex RS-485 Transceiver). The charger transceiver 1230 receives a transmission signal 1240 from the charger controller 1210 and sends a receiver signal 1245 to the charger controller 1210. The charger transceiver 1230 is also connected to the communication terminals.

When the charger 1200 transmits a communication signal to a connected battery pack 100, the charger controller 1210 sends the transmission signal 1240 in addition to a transmission enable signal 1250 to the charger transceiver 1230. When the charger transceiver 1230 receives the transmission enable signal 1250, the charger transceiver 1230 converts the transmission signal 1240 to complementary transmission signals at the positive transmission terminal 1125 and the negative transmission terminal 1130.

When the charger transceiver 1230 receives a receiver enable signal 1155 from the charger controller 1210, the charger transceiver 1230 receives complementary signals from the positive receiver terminal 1135 and the negative receiver terminal 1140, converts the complementary signals to a single receiver signal 1145, and sends the receiver signal 1145 to the charger controller 1210.

In other embodiments, rather than the charger transceiver 1230, the charger 1200 may include separate transmitting and receiving components, for example, a transmitter and a receiver.

Whenever the battery pack 100 connects to an electrical device 1000 or a charger 1200 for the first time, a full authentication process may be done before the electrical device 1000 or the charger 1200 may be granted permission for deployment. A quick re-authentication feature enables a fast means for devices to re-engage after a sleep event without requiring a full authentication.

This quick re-authentication process starts after a successful full authentication, in which the device controller 1010 (or a charger controller 1210) generates a random number (or a series of random numbers) and shares those numbers with the battery pack 100. These numbers are used as quick "keys" to re-authenticate after waking from sleep. If, after waking, the device controller 1010 loads one of those values into the quick authentication location, then the battery pack 100 considers itself authenticated to the electrical device 1000. If an invalid value is loaded, then a full authentication is required.

To accomplish this, the battery pack 100 has a "QUICK AUTHENTICATION" memory location, as well as a "SET QUICK AUTHENTICATION" location. The SET QUICK AUTHENTICATION may be write-only and may only able to be written after the battery pack 100 considers itself authenticated to the electrical device 1000 (or the charger 1200). The battery pack 100 may no longer consider itself fully authenticated once the battery transceiver 330 is put to sleep; however, the quick authentication is available unless the battery pack 100 has explicitly been instructed to drop the authentication session. This may happen, for example, when the electrical device 1000 detects that the battery pack 100 is about to be ejected and thus requests the battery pack 100 to drop the session.

Figure 13:
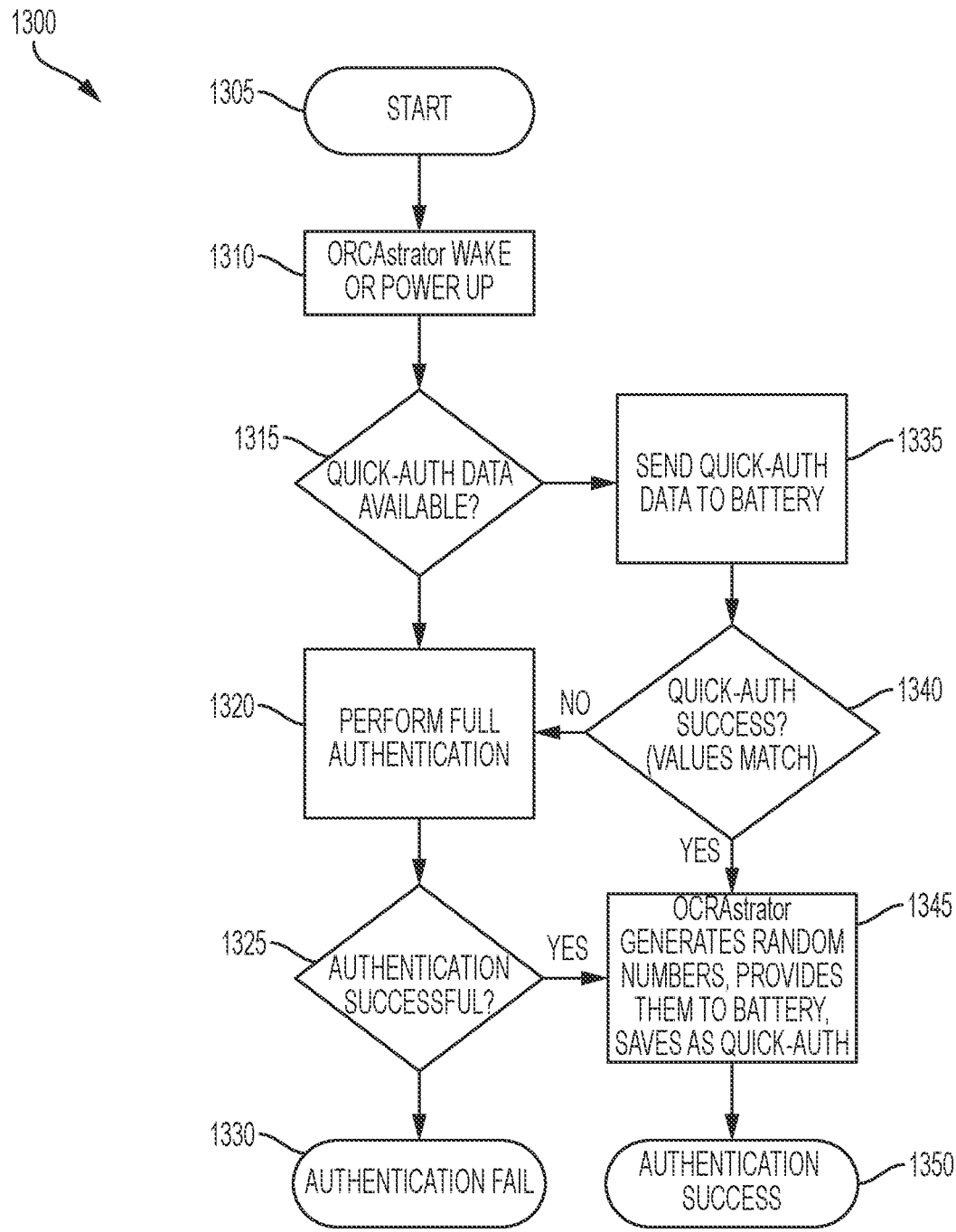
FIG. 13 is a flowchart illustrating a quick re-authentication process between a battery pack and an electrical device.

QUICK AUTHENTICATION may be write-only and may only able to be written once prior to requiring a full authentication. This may be one of the only memory locations that is writeable when the battery pack 100 is not in an authenticated state. After QUICK AUTHENTICATION is written (once only), the value in QUICK AUTHENTICATION is compared to the value in SET QUICK AUTHENTICATION. If they match, the battery pack 100 considers itself authenticated. If they do not match, then the battery pack 100 requires a full authentication prior to any other communications. This process is illustrated in FIG. 13.

In order to facilitate the power down process of the system, a latch engagement system may be incorporated into a latch interface. This engagement system may consist of a switch which will inform the device controller 1010 that the battery pack 100 is about to be removed from the electrical device 1000. Thus, the electrical device 1000 may enact a shutdown procedure of its power path and inform the battery pack 100 of the same.

When the communication session between the battery pack 100 and the electrical device 1000 is terminated, the battery pack 100 drops the authenticated session, disables the battery transceiver 330, and enables a wakeup circuit. The battery pack 100 may need a wake-up signal through the battery transceiver 330 and then re-authentication to once again begin a valid communications session.

When the latch of the electrical device 1000 is engaged with the battery pack 100, the electrical device 1000 enters a discovery mode. In the discovery mode, the electrical device 1000 sends a wake up pulse and begins an authentication process. When the latch is not engaged, the electrical device 1000 enters a sleep mode, in which the electrical device 1000 may be woken up when the latch is engaged.

At a physical interface level (i.e., physical interface between a battery pack 100 and the charger 1200 or the electrical device 1000), a communications session timeout may be enforced. Because full duplex communications are permitted, there are separate timeout rules for both the transmitter and the receiver. In short, communications must occur at a rate of at least every 10 msec. If communications do not happen within 10 msec, then the physical interface may timeout the session. In order to allow multiple retries within 10 msec, the communications period may be set at 4 msec intervals. Thus, if a fault happens, at least one retry is permitted before the physical interface will timeout and fault the communications session.

Figures 14, 15:
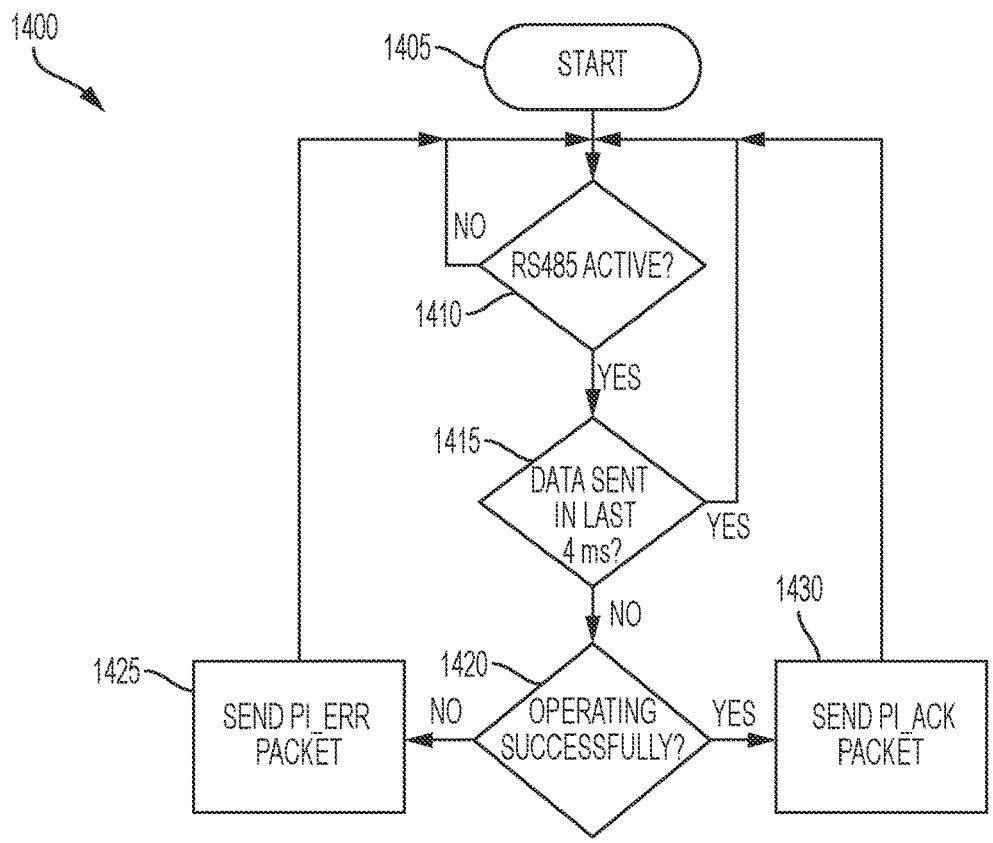
FIG. 14 is a flowchart illustrating a transmitter function of a battery transceiver of the battery pack of FIG. 1.
FIG. 15 is a flowchart illustrating a receiver function of a battery transceiver of the battery pack of FIG. 1.

A timing of both the transmitter and the receiver is illustrated in FIGS. 14-15. The table below is a further explanation of the timeout conditions.

| Role | Period | Action | Rationale |
| --- | --- | --- | --- |
| Transmitter | 4 msec | Packet byte | Normal comms occurring every period |
| | | PI_ACK | If receiving a packet that is longer than the period, then transmit the PI_ACK to indicate the session is still valid |
| | | PI_ERROR | If an error condition occurs at the PI level, relay this generic information to the other device |
| Receiver | 10 msec | Drop communications session | If the receiver has not received A valid byte A PI_ACK (as first byte) A PI_ERROR (as first byte) Assume the communications session is faulted |

Referring to FIGS. 9 and 11, a thickness of one or more male terminals of an electrical device or a battery charger can be selected to optimize weight, strength, and durability characteristics of the terminal(s). In some embodiments, the terminals have a thickness of between 0.8 millimeter (mm) and 1.2 mm. In one example, the terminals have a thickness of about 1 mm.

Figure 16:
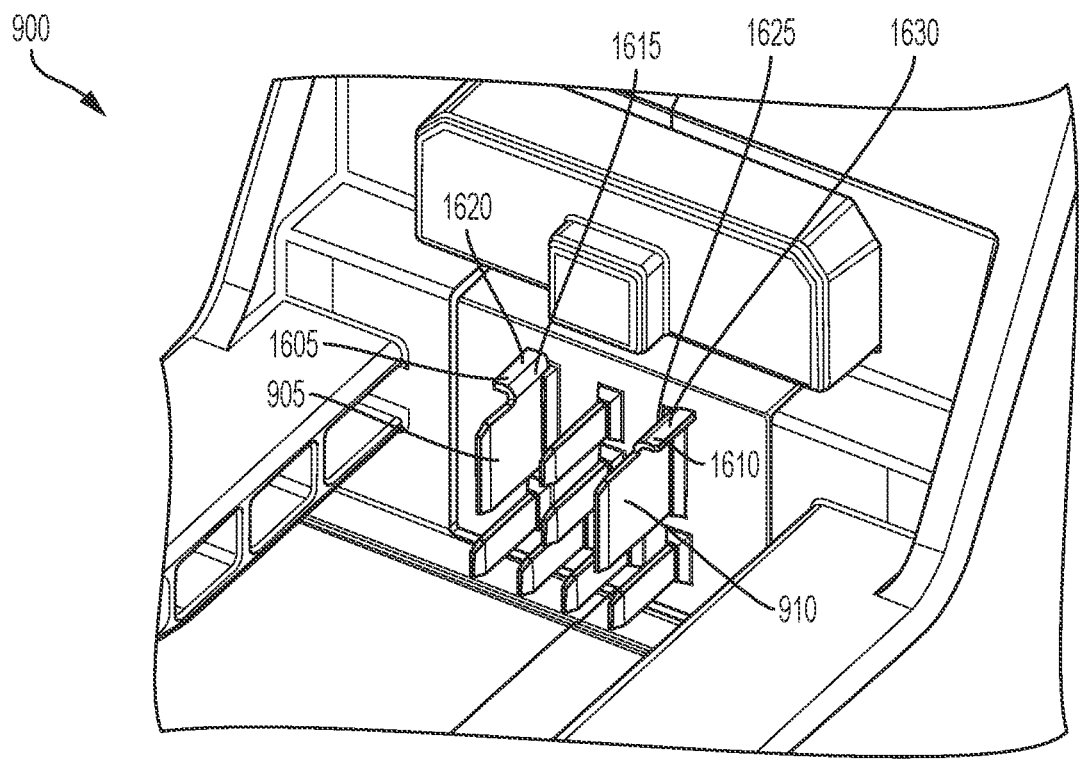
FIG. 16 is an isometric view of a terminal block of an electrical device.

In some constructions, male terminals 1110-1140 are (see FIGS. 9 and 11) generally flat plates, including opposite axially-extending faces connected by opposite axially-extending edges. Each terminal 1110-1140 extends from the housing to a free end. In some constructions (see FIG. 16), terminals (including power terminals 905, 910) extend above the structure of the guide rails 1260.

In some embodiments (see, e.g., FIGS. 16 and 18), the terminals 905, 910 may be constructed to increase the strength, durability, etc., to, for example, protect against damage during drops or during handling of the electrical devices. In one construction (see FIG. 16), a terminal (e.g., the positive power terminal 905, the ground terminal 910, etc.) includes a wing (e.g., a positive terminal wing 1605, a ground terminal wing 1610, etc.).

The illustrated positive terminal wing 1605 is integrally formed with the positive power terminal 905 and includes a connecting portion 1615 and a ledge portion 1620. In the illustrated construction, the ledge portion 1620 extends transverse (e.g., substantially perpendicular) to the positive power terminal 905 towards a first side edge of the device terminal block 900. The connecting portion 1615 transitions (e.g., curves) between and connects the positive power terminal 905 and the ledge portion 1620.

Similarly, the illustrated ground terminal wing 1610 is integrally formed with the ground terminal 910 and includes a connecting portion 1625 and a ledge portion 1630. In the illustrated construction, the ledge portion 1630 extends transverse (e.g., substantially perpendicular) to the ground terminal 910 toward an opposite second side edge of the device terminal block 900. The connecting portion 1625 transitions (e.g., curves) between and connects the ground terminal and the ledge portion 1630.

The terminal wings 1605, 1610 may be provided such that they extend only part of the axial length (e.g., between about 25% and about 50% of the axial length) of the associated terminal 905, 910, respectively. Only the part of the terminal 905, 910 extending beyond the associated terminal wing 1605, 1610 may be received in the female terminal of the battery pack terminal block 115 (see FIGS. 19-20). The terminal wings 1605, 1610 do not interfere with electrical connection between the terminals of the electrical device and the battery pack. In other embodiments, the terminal wings 1605, 1610 may extend the full axial length of the associated terminal 905, 910 respectively.

Figure 17:
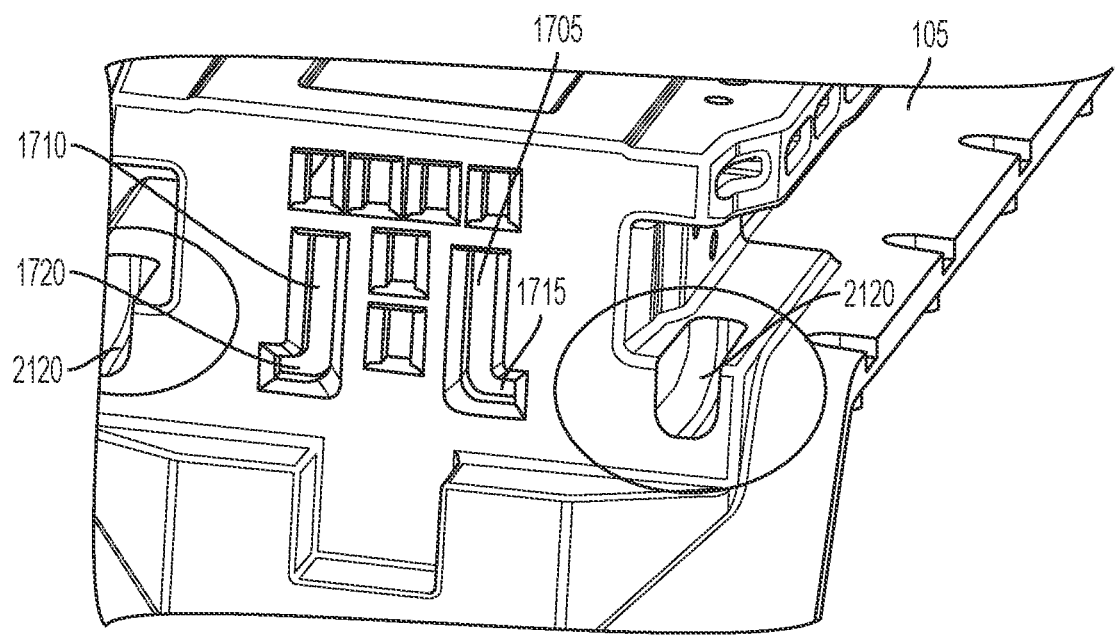
FIG. 17 is an isometric view of a terminal block of the battery pack of FIG. 1.

Referring to FIG. 17, the battery pack housing 105 may be constructed to accommodate the terminal wing(s) 1605, 1610. The housing 105 includes a positive power terminal opening 1705 and a ground terminal opening 1710 to receive the positive power terminal 905 and the ground terminal 910, respectively. In the illustrated construction, the positive power terminal opening 1705 includes a wing-receiving portion 1715 shaped to receive the positive terminal wing 1605. Similarly, the illustrated ground terminal opening 1710 includes a wing-receiving portion 1720 shaped to receive the ground terminal wing 1610. The wing 1605, 1610 may engage a wall of the associated wing-receiving portion 1715, 1720 to, for example, transfer forces, limit relative movement between the battery pack and the electrical device, etc., during drops or during handling of the electrical devices.

A battery pack housing (not shown) which is not constructed to accommodate the winged terminals 905, 910 (e.g., without the wing-receiving portion 1710, 1720) may be prevented from electrically connecting with an electrical device or a charger including such winged terminals 905, 910. The winged terminals 905, 910 may contribute to a lock-out feature to inhibit electrical connection of incompatible battery packs and electrical devices or chargers.

Figure 18:
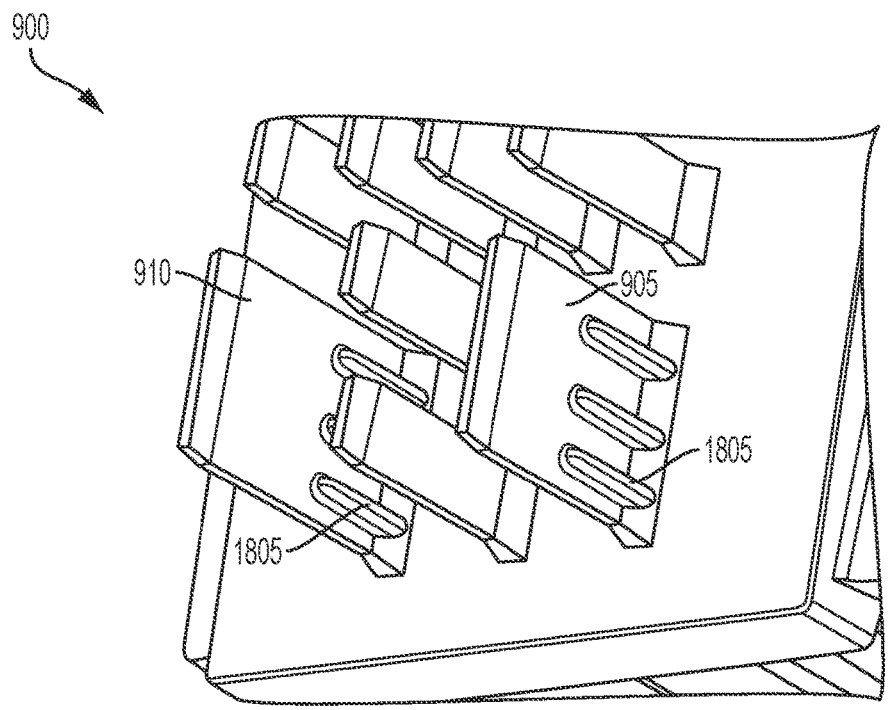
FIG. 18 is an isometric view of a terminal block of an electrical device.

In some embodiments, additional structure (e.g., support ribs, dimples, etc., having different shapes, constructions) may be provided on the power terminal(s) instead of or in addition to the terminal wing(s) 1605, 1610. Referring to FIG. 18, the positive power terminal 905 and the ground terminal 910 are provided with one or more support ribs 1805 on one face. The rib(s) 1805 provide additional support to each terminal 905, 910.

Figure 24:
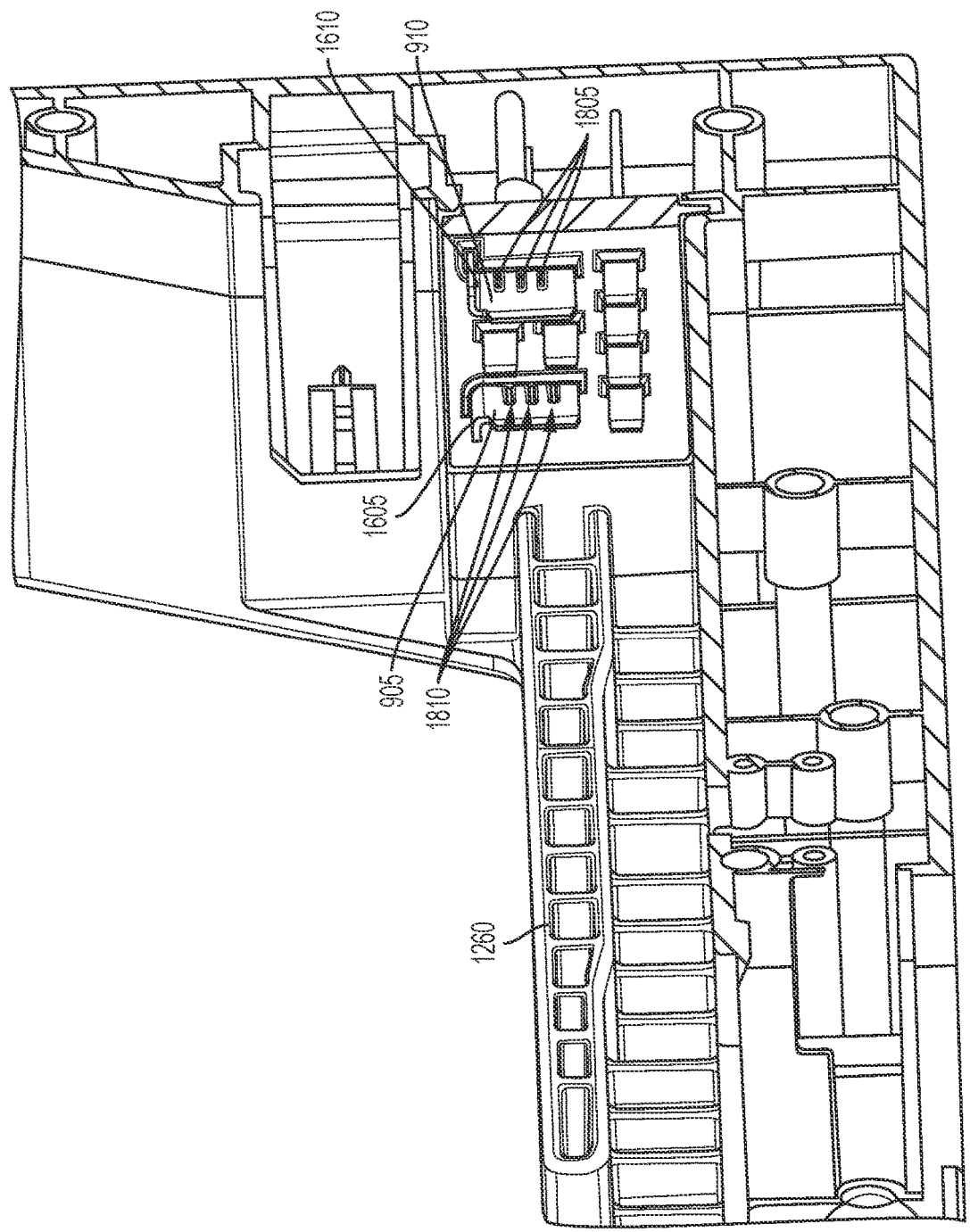
FIG. 24 is a perspective view of a portion of an electrical device.
Figure 25:
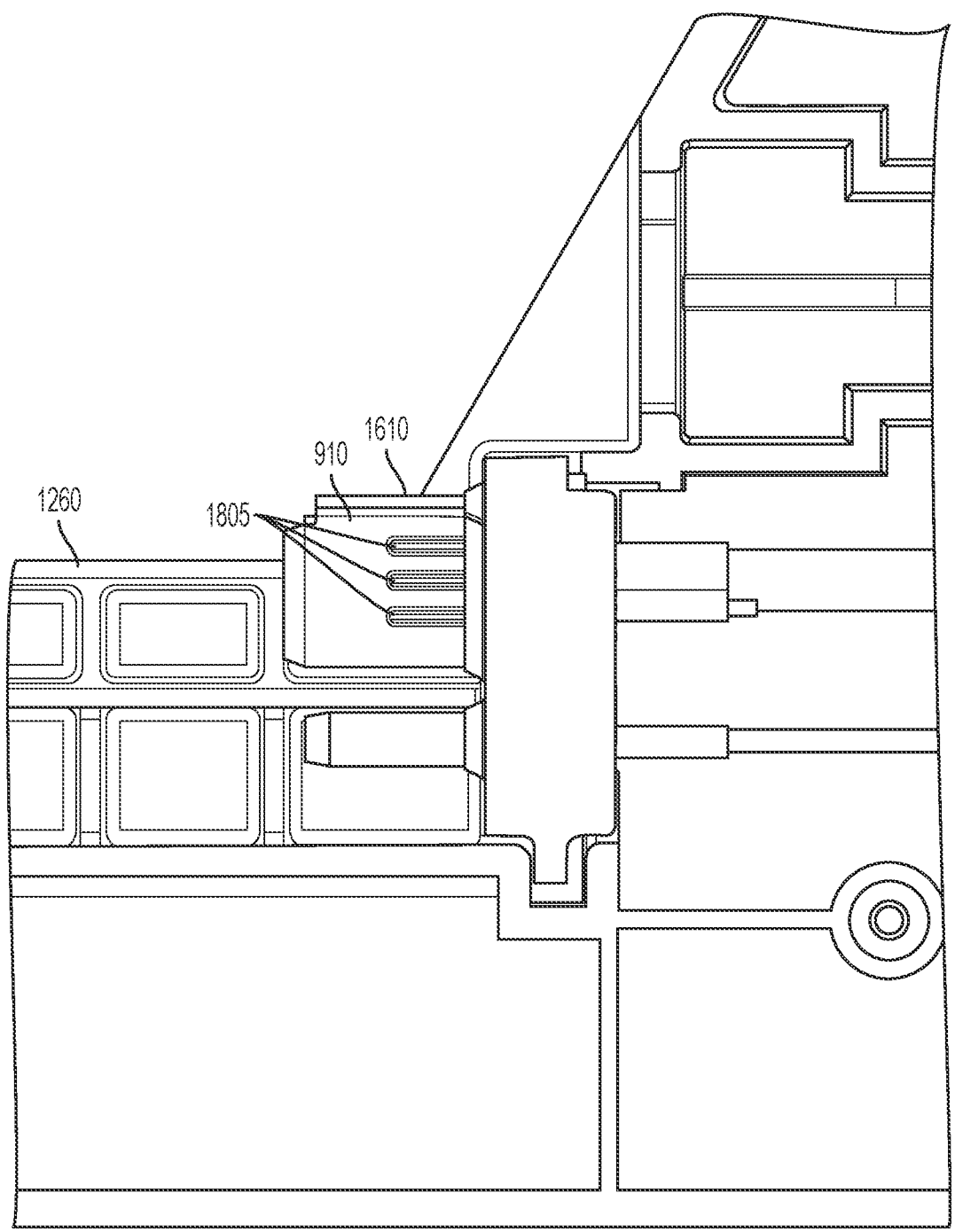
FIG. 25 is a side view of the portion of the electrical device as shown in FIG. 24.
Figure 26:
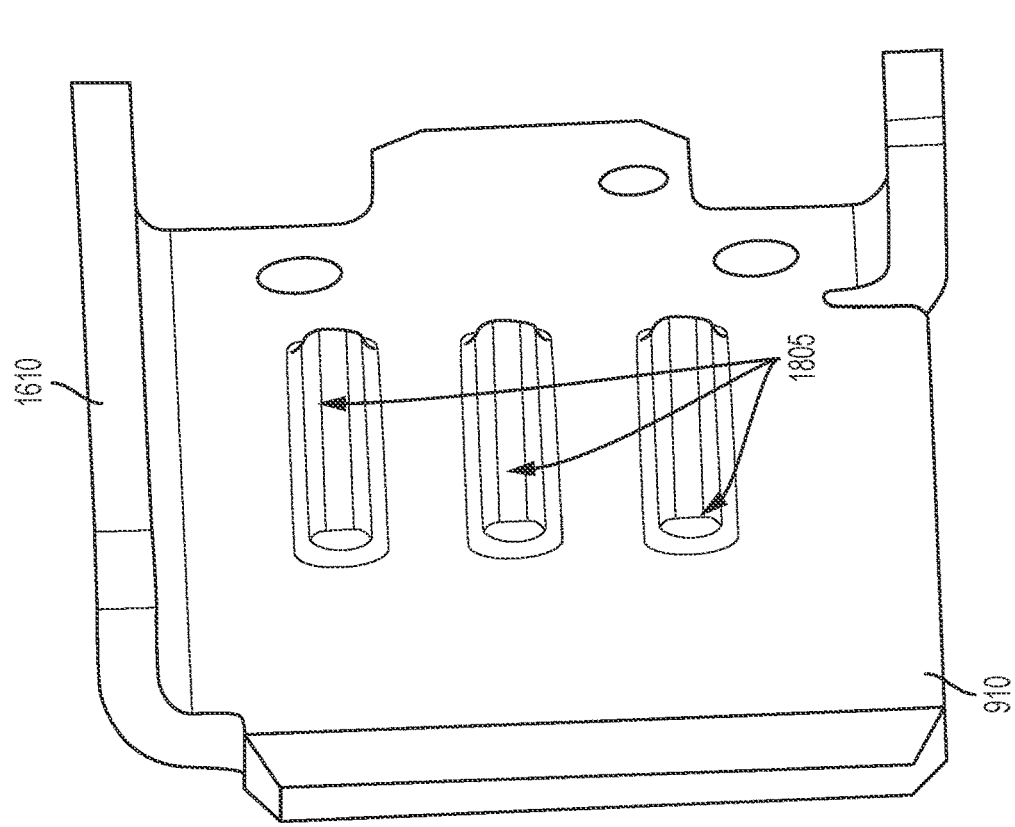
FIG. 26 is a perspective view of power terminals shown in FIG. 24.
Figure 26:
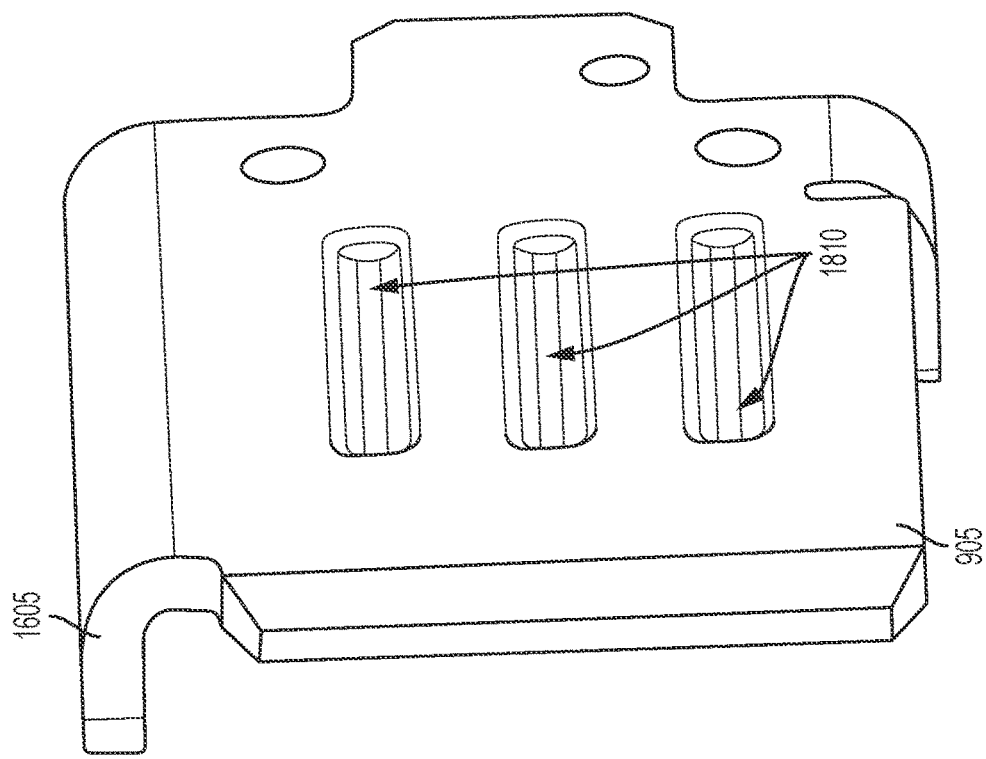

In some embodiments (see FIG. 18), the ribs 1805 are separate from and attached to the terminal(s) 910. In such constructions, the ribs 1805 may be formed of a different material (e.g., plastic) than the terminal(s) 905, 910 (formed of metal). In some embodiments (see FIGS. 24-26), the ribs 1805 are integrally formed with the terminal(s) 905, 910 and of the same material (e.g., metal).

With multiple support ribs 1805, the ribs 1805 are spaced apart (e.g., substantially equidistant) along the face of the terminal 905, 910. The ribs 1805 may be provided such that they extend only part of the axial length (e.g., between about 25% and about 50% the axial length (e.g., about 33%)) of the associated terminal 905, 910. Only the part of the terminal 905, 910 extending beyond the ribs 1805 is received in the female terminals of the battery pack terminal block 115 (see FIGS. 19-20). The ribs 1805 do not inhibit electrical connection between the terminals of the electrical device and the battery pack. In other embodiments, the ribs 1805 may extend the full axial length of the associated terminal 905, 910.

Figure 19:
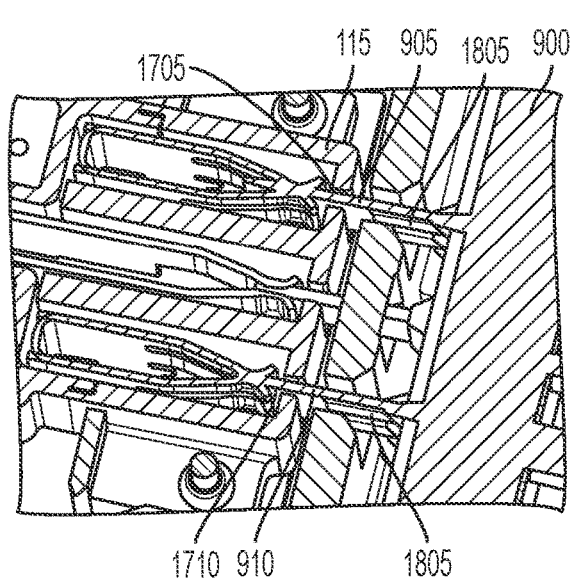
FIG. 19 is a perspective view of a connection between the terminal block of the power of FIG. 18 with a terminal block of the battery pack of FIG. 1.
Figure 20:
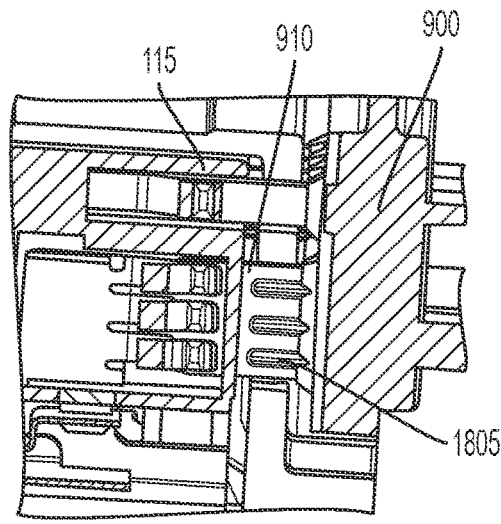
FIG. 20 is a perspective view of a connection between the terminal block of the power of FIG. 18 with a terminal block of the battery pack of FIG. 1.

Referring to FIGS. 19-20, the battery pack housing 105 is constructed to accommodate the terminal(s) 905, 910 with the rib(s) 1805. Particularly, the width of the positive power terminal opening 1705 and the ground terminal opening 1710 is increased to accommodate the ribs 1805.

A battery pack housing (not shown) which is not constructed to accommodate the terminal(s) 905, 910 with rib(s) 1805 (e.g., without the increased width terminal opening(s) 1705, 1710) may be prevented from electrically connecting with an electrical device or a charger including such terminals 905, 910. The terminal(s) 905, 910 with rib(s) 1805 may contribute to a lock-out feature to inhibit electrical connection of incompatible battery packs and electrical devices or chargers.

In some constructions (see FIGS. 24-26), one or more terminal(s) (e.g., the terminals 905, 910) include wings 1605, 1610, respectively, and ribs 1805. The terminal wings 1605, 1610 may be provided such that they extend only part of the axial length (e.g., between about 75% and about 95% (e.g., about 91%) of the axial length) of the associated terminal 905, 910, respectively. Likewise, the ribs 1805 may be provided such that they extend only part of the axial length (e.g., between about 25% and about 50% the axial length (e.g., about 33%)) of the associated terminal 905, 910. As shown, the length of the wings 1605, 1610 and the ribs may be different. In other embodiments, the terminal wings 1605, 1610 and the ribs 1805 may extend the full axial length of the associated terminal 905, 910 respectively.

In the illustrated construction, each wing 1605, 1610 is formed with the associated terminal 905, 910. The illustrated ribs 1805 are also formed with the associated terminal 905, 910, for example, by stamping, such that the opposite face of the terminal 905, 910 has corresponding recesses 1810.

It should be understood that, in other constructions (not shown), the battery pack may include male terminals and the electrical device and the charger may include female terminals. In such constructions (not shown), the pack male terminal(s) may include the wing(s) and/or the support rib(s), and the device housing or the charger housing may include the terminal opening to accommodate the wing(s), the rib(s), etc.

Figure 21:
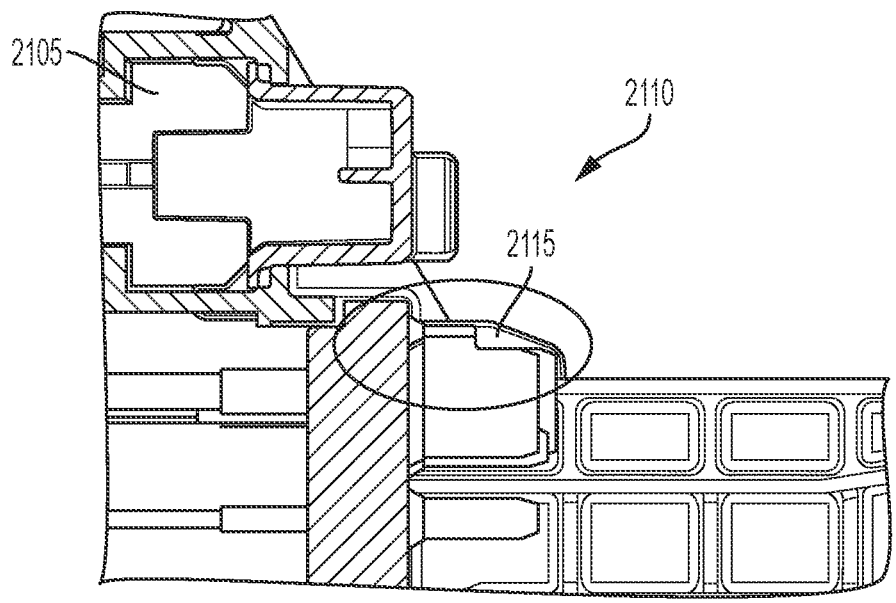
FIG. 21 is a perspective view of a terminal block portion of an electrical device.
Figure 22:
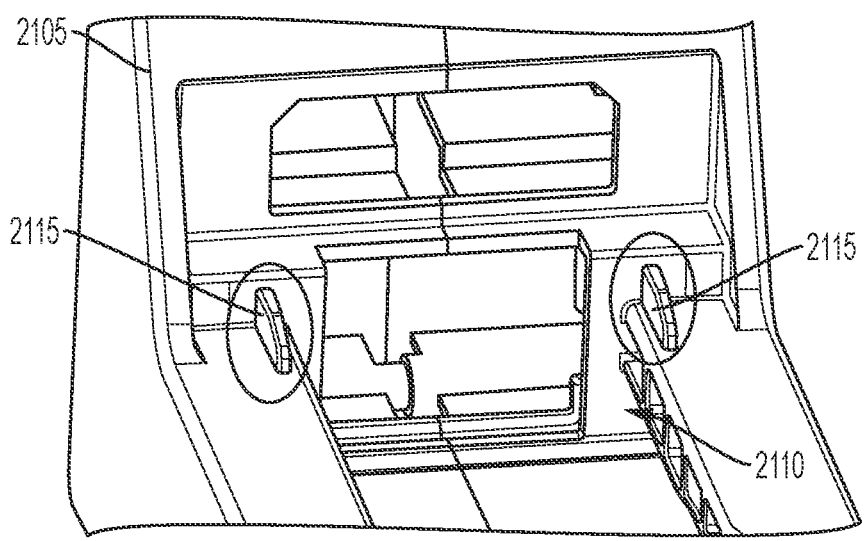
FIG. 22 is another perspective view of the terminal block portion of FIG. 21.

In some embodiments, additional support structures are added to the device housing and the battery pack housing 105. FIGS. 21-22 illustrate a device housing 2105 including a terminal block portion 2110. The terminal block portion 2110 includes ribs 2115 positioned outside each side surface of the device terminal block 900.

Referring to FIG. 17, the pack housing 105 is constructed to accommodate the ribs 2115. Cutouts 2120 in the pack housing 105 receive the ribs 2115 when the battery pack is attached to the electrical device.

Figure 23:
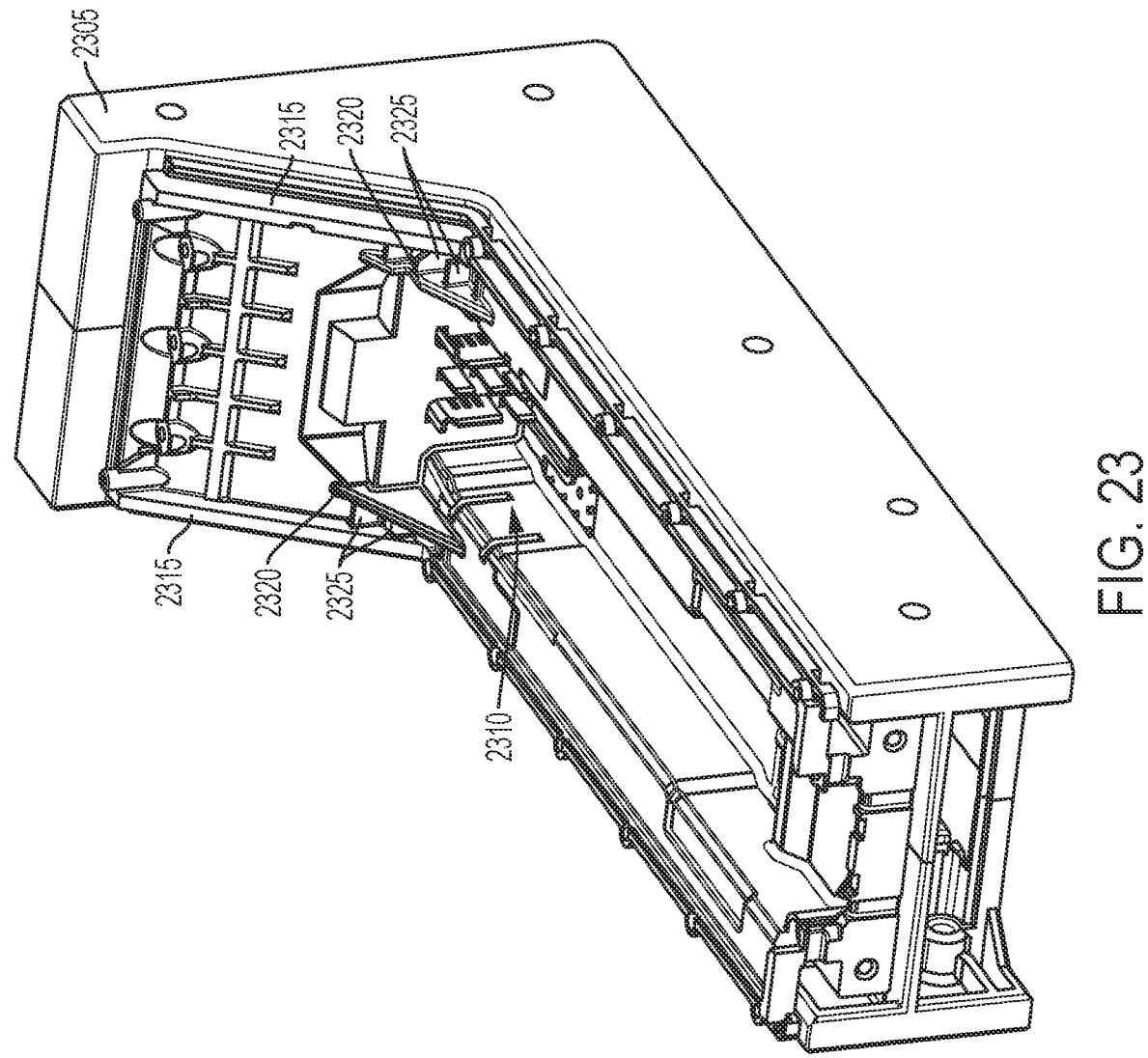
FIG. 23 is an isometric view of a terminal block of an electrical device.

FIG. 23 illustrates another embodiment of a device housing 2305 including a terminal block portion 2310. The device housing 2305 includes side surface ribs 2315 on either side (that is, a first side and a second side) of the housing 2305. Support ribs 2320 are positioned on either side of the terminal block portion 2310. The illustrated support ribs 2320 are provided on an inside portion compared to the side surface ribs 2315 on the device housing 2305.

Additional connection ribs 2325 are positioned between the support ribs 2320 and the side surface ribs 2315. The connection ribs 2325 connect the support ribs 2320 to the side surface ribs 2315 to support the support ribs 2320. The rib arrangement including the side surface ribs 2315, the support ribs 2320, and the connection ribs 2325 provide additional support to the terminal block portion 2310 to, for example, protect against damage during drops or during handling of the electrical devices.

Thus, the invention may provide, among other things, a battery pack terminal configuration. The configuration may include a low-power terminal and/or a row of one or more communication terminals spaced from a row of power terminals. The invention may provide a battery pack including a low power circuit operable to provide a reduced voltage from all of the battery cells of the battery pack to the powered electrical device. The invention may provide a terminal (e.g., a male blade terminal) with terminal support structure (e.g., a wing, one or more ribs, etc.).

One or more independent features and/or independent advantages of the invention may be set forth in the claims.

What is claimed is:

1. An electrical combination comprising:
   a battery pack including:
      a pack housing,
      a plurality of battery cells supported by the pack housing, and
      a pack terminal electrically connected to the battery cells; and
   an electrical device including:
      a device housing,
      a circuit supported by the device housing, and
      a device terminal electrically connected to the circuit and electrically connectable to the pack terminal to electrically connect the circuit to one or more battery cells;
   one of the pack terminal and the device terminal including:
      a terminal blade extending along an axis and having opposite axially-extending faces connected by opposite axially-extending edges, and
      a terminal support portion extending transverse to the axis and beyond an associated face.

2. The electrical combination of claim 1, wherein the device terminal includes the terminal blade and the terminal support portion.

3. The electrical combination of claim 2, wherein the battery pack includes a pack positive power terminal and a pack ground terminal, wherein the electrical device includes a device positive power terminal electrically connectable to the pack positive power terminal and a device ground terminal electrically connectable to the pack ground terminal, wherein the device positive power terminal includes the terminal blade and the terminal support portion, wherein the device ground terminal includes a terminal blade and a terminal support portion, and wherein each terminal support portion includes a transverse wing connected to one edge.

4. The electrical combination of claim 3, wherein an opposite one of the pack housing and the device housing defines an opening having a first portion receiving the terminal blade and a transverse second portion receiving the transverse wing.

5. The electrical combination of claim 3, wherein the electrical device includes a terminal block having a first side and an opposite second side, wherein the device positive power terminal is positioned toward the first side, the wing of the device positive power terminal extending toward the first side, and wherein the device ground terminal is positioned toward the second side, the wing of the device ground terminal extending toward the second side.

6. The electrical combination of claim 3, wherein each terminal support portion includes at least one rib on the associated face.

7. A terminal block for one of a battery pack and an electrical device electrically connectable to the battery pack along an axis, the terminal block comprising:
   a housing; and
   a plurality of terminals including a positive power terminal and a ground terminal, at least one terminal including a terminal blade extending along the axis and having opposite axially-extending faces connected by opposite axially-extending edges, and a terminal support portion extending transverse to the axis and beyond an associated face.

8. The terminal block of claim 7, wherein the positive power terminal includes a terminal blade and a terminal support portion, wherein the ground terminal includes a terminal blade and a terminal support portion, and wherein each terminal support portion includes a transverse wing connected to one edge.

9. The terminal block of claim 8, wherein the terminal block has a first side and an opposite second side, wherein the positive power terminal is positioned toward the first side, the terminal support portion of the positive power terminal extending toward the first side, and wherein the ground terminal is positioned toward the second side, the terminal support portion of the ground terminal extending toward the second side.

10. The terminal block of claim 9, wherein each terminal support portion also includes at least one rib on the associated face.

11. The terminal block of claim 7, wherein the terminal support portion includes at least one rib on the associated face.

12. The terminal block of claim 7, wherein the terminal blade has an axial length between a free end and an opposite end, the support portion extending from proximate the opposite end toward the free end a distance less than the axial length of the terminal blade.

13. The terminal block of claim 12, wherein the distance is between about 25% and about 50% of the axial length.

14. The terminal block of claim 12, wherein the distance is between about 75% and about 95% of the axial length.

15. A terminal for one of a battery pack and an electrical device electrically connectable to the battery pack along an axis, the terminal comprising:

a terminal blade extending along the axis and having opposite axially-extending faces connected by opposite axially-extending edges; and a terminal support portion extending transverse to the axis and beyond an associated face.

16. The terminal of claim 15, wherein the terminal support portion includes a transverse wing connected to one edge, wherein the transverse wing is formed with the terminal blade.

17. The terminal of claim 16, wherein the terminal blade has an axial length between a free end and an opposite end, the wing extending from proximate the opposite end toward the free end a distance between about 25% and about 50% of the axial length.

18. The terminal of claim 16, wherein the terminal blade has an axial length between a free end and an opposite end, the wing extending from proximate the opposite end toward the free end a distance between about 75% and about 95% of the axial length.

19. The terminal of claim 16, wherein the terminal support portion also includes at least one rib on the associated face.

20. The terminal of claim 15, wherein the terminal blade has an axial length between a free end and an opposite end, the terminal support portion extending from proximate the opposite end toward the free end a distance less than the axial length of the terminal blade.

* * * * *